United States Patent
Watanabe et al.

(10) Patent No.: US 10,878,253 B2
(45) Date of Patent: Dec. 29, 2020

(54) PERIPHERY MONITORING DEVICE

(71) Applicant: AISIN SEIKI KABUSHIKI KAISHA, Kariya (JP)

(72) Inventors: Kazuya Watanabe, Anjo (JP); Yoji Inui, Ama-gun (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 104 days.

(21) Appl. No.: 16/313,320

(22) PCT Filed: Mar. 14, 2017

(86) PCT No.: PCT/JP2017/010281
§ 371 (c)(1),
(2) Date: Dec. 26, 2018

(87) PCT Pub. No.: WO2018/003194
PCT Pub. Date: Jan. 4, 2018

(65) Prior Publication Data
US 2019/0163988 A1    May 30, 2019

(30) Foreign Application Priority Data
Jun. 30, 2016    (JP) .................. 2016-129636

(51) Int. Cl.
*G06K 9/00* (2006.01)
*B60W 50/14* (2020.01)
(Continued)

(52) U.S. Cl.
CPC ............ *G06K 9/00791* (2013.01); *B60R 1/00* (2013.01); *B60R 1/002* (2013.01); *B60R 1/06* (2013.01);
(Continued)

(58) Field of Classification Search
None
See application file for complete search history.

(56) References Cited

U.S. PATENT DOCUMENTS

2012/0158256 A1\* 6/2012 Kuboyama ........ B62D 15/0275
701/51
2013/0110386 A1\* 5/2013 Jin ........................ B60W 40/06
701/119
(Continued)

FOREIGN PATENT DOCUMENTS

CN   104541128 A   4/2015
JP   6-255393 A    9/1994
(Continued)

OTHER PUBLICATIONS

C. Guo, K. Kidono, J. Meguro, Y. Kojima, M. Ogawa and T. Naito, "A Low-Cost Solution for Automatic Lane-Level Map Generation Using Conventional In-Car Sensors," in IEEE Transactions on Intelligent Transportation Systems, vol. 17, No. 8, pp. 2355-2366, Aug. 2016, doi: 10.1109/TITS.2016.2521819. (Year: 2016).\*
(Continued)

*Primary Examiner* — Kim Y Vu
*Assistant Examiner* — Nathan J Bloom
(74) *Attorney, Agent, or Firm* — Sughrue Mion, PLLC

(57) ABSTRACT

A periphery monitoring device includes a gradient acquisition unit that acquires a gradient position a gradient value on a road surface and, based on state information indicating a state of the road surface in a traveling direction of a vehicle. The periphery monitoring device also includes a notification control unit that compares the acquired gradient value with a reference gradient value at which the vehicle can pass, and notifies of the comparison result in association with the gradient position.

8 Claims, 12 Drawing Sheets

(51) Int. Cl.
*B60W 40/076* (2012.01)
*G08G 1/0969* (2006.01)
*B60R 1/00* (2006.01)
*G01C 21/26* (2006.01)
*G08G 1/16* (2006.01)
*B60R 11/04* (2006.01)
*B60R 1/06* (2006.01)

(52) U.S. Cl.
CPC .......... *B60R 11/04* (2013.01); *B60W 40/076* (2013.01); *B60W 50/14* (2013.01); *G01C 21/26* (2013.01); *G06K 9/00805* (2013.01); *G08G 1/0969* (2013.01); *G08G 1/16* (2013.01); *B60R 2300/105* (2013.01); *B60R 2300/207* (2013.01); *B60R 2300/302* (2013.01); *B60W 2050/146* (2013.01); *B60W 2420/42* (2013.01); *B60W 2552/15* (2020.02); *B60W 2552/20* (2020.02)

(56) References Cited

U.S. PATENT DOCUMENTS

| | | | |
|---|---|---|---|
| 2015/0174981 A1* | 6/2015 | Buma | G06K 9/00798 701/38 |
| 2016/0059700 A1 | 3/2016 | Watanabe et al. | |
| 2016/0263997 A1* | 9/2016 | Mizutani | B60R 1/00 |
| 2017/0106750 A1* | 4/2017 | Tauchi | B60R 1/00 |
| 2017/0357861 A1* | 12/2017 | Okuda | G06K 9/00805 |

FOREIGN PATENT DOCUMENTS

| | | |
|---|---|---|
| JP | 7-113866 A | 5/1995 |
| JP | 2005-23916 A | 1/2005 |
| JP | 2010-287015 A | 12/2010 |
| JP | 5337878 B2 | 11/2013 |
| JP | 5434285 B2 | 3/2014 |
| WO | 2011/010346 A1 | 1/2011 |

OTHER PUBLICATIONS

C. Guo, S. Mita and D. McAllester, "Robust Road Detection and Tracking in Challenging Scenarios Based on Markov Random Fields With Unsupervised Learning," in IEEE Transactions on Intelligent Transportation Systems, vol. 13, No. 3, pp. 1338-1354, Sep. 2012, doi: 10.1109/TITS.2012.2187896. (Year: 2012).*

Y. Zhu, D. Comaniciu, M. Pellkofer and T. Koehler, "Reliable Detection of Overtaking Vehicles Using Robust Information Fusion," in IEEE Transactions on Intelligent Transportation Systems, vol. 7, No. 4, pp. 401-414, Dec. 2006, doi: 10.1109/TITS.2006.883936. (Year: 2006).*

JP2010287015A English Language Translation of Foreign Document, Inventor: Takehiko; Applicant: Konica Minolta; Published: Dec. 24, 2010 (Year: 2010).*

International Search Report for PCT/JP2017/010281, dated Jun. 20, 2017.

Notice of Reasons for Refusal dated Jun. 30, 2020, from the Japanese Patent Office in Application No. 2016-129636.

Communication dated Oct. 12, 2020 from the China National Intellectual Property Administration in Application No. 201780038079.9.

* cited by examiner

PERIPHERY MONITORING DEVICE

CROSS-REFERENCE TO RELATED APPLICATIONS

This application is national stage application of International Application No. PCT/JP2017/010281, filed Mar. 14, 2017, which designates the United States, incorporated herein by reference, and which claims the benefit of priority from Japanese Patent Application No. 2016-129636, filed Jun. 30, 2016, the entire contents of which are incorporated herein by reference.

TECHNICAL FIELD

The present invention relates to a periphery monitoring device.

BACKGROUND ART

Conventionally, a technique for notifying a state of a road surface toward which a vehicle is about to proceed, by displaying the surrounding video of the vehicle picked up by an on-board camera on a display device disposed in the vehicle chamber has been known.

CITATION LIST

Patent Literature

Patent Document 1: Japanese Patent No. 5337878

SUMMARY OF INVENTION

Problem to be Solved by the Invention

However, it is sometimes difficult to identify the actual irregularity of the road surface, only using the peripheral image photographed by the on-board camera. Moreover, when the irregularity cannot be sufficiently identified, it is sometimes difficult to determine whether the vehicle can actually climb over the irregularity and continue traveling. For example, it is sometimes difficult to determine whether the irregularity may rub and damage the vehicle body bottom surface, whether the vehicle may be unable to travel when the vehicle body bottom surface runs onto a projection part and the driving force is not transmitted to the wheels, or the like.

Consequently, one of the objects of the present invention is to provide a periphery monitoring device capable of providing new information indicating the state of a road surface to the driver, and allowing the driver to easily determine whether the vehicle can travel.

Means for Solving Problem

A periphery monitoring device according to the embodiment of the present invention includes, for example, a gradient acquisition unit that acquires a gradient position and a gradient value on a road surface, based on state information indicating a state of the road surface in a traveling direction of a vehicle; and a notification control unit that compares the gradient value with a reference gradient value at which the vehicle is able to pass, and notifies of a comparison result in association with the gradient position. With this configuration, for example, when there is a gradient on the road surface such as an inclined plane and an irregularity, the size of the gradient (gradient value) and the position of the gradient are detected, the gradient value of the road surface is compared with the reference gradient value at which the vehicle can pass, and the driver is notified of the comparison result. As a result, it is possible to let the driver easily identify whether the vehicle can travel the road surface.

Further, in the above periphery monitoring device, for example, the gradient acquisition unit may acquire, as the gradient value, a relative inclination of a road surface in front of the vehicle, using, as reference, a road surface on which the vehicle is present. With this configuration, for example, it is possible to detect whether the road surface that continues to the road surface on which the vehicle is currently present is a road surface that comes into contact (rubs) with the bottom portion of the vehicle regardless of the current state of the road surface. Consequently, it is possible to more accurately determine whether the vehicle can travel.

Further, in the above periphery monitoring device, for example, the gradient acquisition unit may acquire inclination with respect to horizontal, as the gradient value. With this configuration, for example, the inclination of the vehicle with respect to horizontal of the road surface toward which the vehicle is about to proceed is acquired at the front of the vehicle. As a result, it is possible to determine whether the vehicle is about to proceed the road surface exceeding the climbing ability (descending ability). Consequently, it is possible to more accurately determine whether the vehicle can travel according to the state of the road surface.

Further, in the above periphery monitoring device, for example, the notification control unit may notify of the gradient position using, as reference, the vehicle. With this configuration, for example, it is possible to notify whether there is a gradient that the driver should pay attention at a position few meters ahead of the vehicle (the concerned vehicle). As a result, it is possible to provide more specific information to the driver, and let the driver more easily determine whether the vehicle can travel the road surface.

Further, in the above periphery monitoring device, for example, the gradient acquisition unit may identify whether a gradient at the gradient position is an ascending gradient or a descending gradient, and, when the gradient is the ascending gradient, the notification control unit may compare the gradient with a reference ascending gradient value and, when the gradient is the descending gradient, the notification control unit may compare the gradient with a reference descending gradient value. With this configuration, for example, it is possible to more accurately determine whether the vehicle can travel according to the state of the road surface.

Further, in the above periphery monitoring device, for example, the notification control unit may display a relative positional relation between the gradient position and the vehicle on a display device that displays an image based on captured image data output from an imaging unit that images a periphery state of the vehicle. With this configuration, for example, the relative positional relation between the gradient position and the vehicle is displayed on the display device. Consequently, it is possible to let the driver visually and easily identify whether the vehicle can travel the road surface, and allow the driver to determine easily and intuitively.

Further, in the above periphery monitoring device, for example, the notification control unit may cause the display device to display the comparison result by performing image processing on the image based on the captured image data.

With this configuration, for example, it is possible to display a portion that has a large gradient (large gradient value) and that the driver needs to be warned and pay attention in a visually emphasized manner. For example, it is possible to more clearly notify whether the vehicle can travel the road surface, by changing the hue and the appearance. Consequently, it is possible to allow the driver to determine easily and intuitively whether the vehicle can travel the road surface.

Further, for example, the above periphery monitoring device may further include an image processing unit that superimposes a route index indicating an estimated traveling direction of a wheel based on a steering angle of the vehicle, on the image based on the captured image data, and the notification control unit may cause the display device to display the comparison result with the route index, when the gradient position is on the route index. With this configuration, for example, when there is a gradient position on the route index, notification to that effect will be made. Thus, it is possible to let the driver easily determine whether the road surface in the direction toward which the vehicle is about to proceed cannot travel. Moreover, because the route index can be moved from the gradient position by changing the steering angle, it is possible to let the driver easily select the route the vehicle can travel.

Further, in the above periphery monitoring device, for example, the notification control unit may change a display mode of at least a part of the route index. With this configuration, for example, it is possible to make the display color of the displayed route index change to the display color for warning the driver to pay attention from halfway of the route index, or perform highlighting. In this case, more accurate notification of the location to which attention needs to be paid can be made. As a result, it is possible to let the driver more suitably select the route.

BRIEF DESCRIPTION OF DRAWINGS

FIG. 1 is a perspective view illustrating an example of a state when a part of a vehicle chamber of a vehicle mounted with a periphery monitoring device according to the embodiment is seen through;

DESCRIPTION OF EMBODIMENTS

Hereinafter, exemplary embodiments of the present invention will be described. The structure of the embodiments described below, and operations, results, and effects provided by the structure are merely examples. The present invention can be implemented by the structure other than that disclosed in the following embodiment, and can obtain at least one of various effects based on the basic structure and secondary effects.

In the present embodiment, for example, a vehicle 1 mounted with a periphery monitoring device (periphery monitoring system) may be an automobile that uses an internal combustion engine, which is not illustrated, as a drive source, in other words, an internal combustion engine automobile. The vehicle 1 may also be an automobile that uses an electric motor, which is not illustrated, as a drive source, in other words, an electric automobile, a fuel-cell automobile, and the like. Moreover, the vehicle 1 may be a hybrid automobile that uses both of the internal combustion engine and the electric motor as the drive source, or may be an automobile provided with another drive source. Furthermore, various transmissions may be mounted on the vehicle 1, and various devices such as a system and parts required for driving the internal combustion engine and the electric motor may also be mounted on the vehicle 1. For example, the vehicle 1 is a vehicle not only capable of suitably traveling what is called an "on-road (mainly a paved road and the equivalent road)", but also an "off-road (mainly an unpaved irregular ground road and the like)". The vehicle 1 is a four-wheel drive vehicle with a drive system in which the driving force is transmitted to all four wheels 3, and all four wheels are used as the driving wheels. The system, the number, the layout, and the like of the device relating to driving the wheels 3 may be set in various ways. For example, the main purpose of the vehicle may be to travel the "on-road". For example, the drive system is not limited to the four-wheel drive system, and may also be a front-wheel drive system or a rear-wheel drive system.

Figure 1:
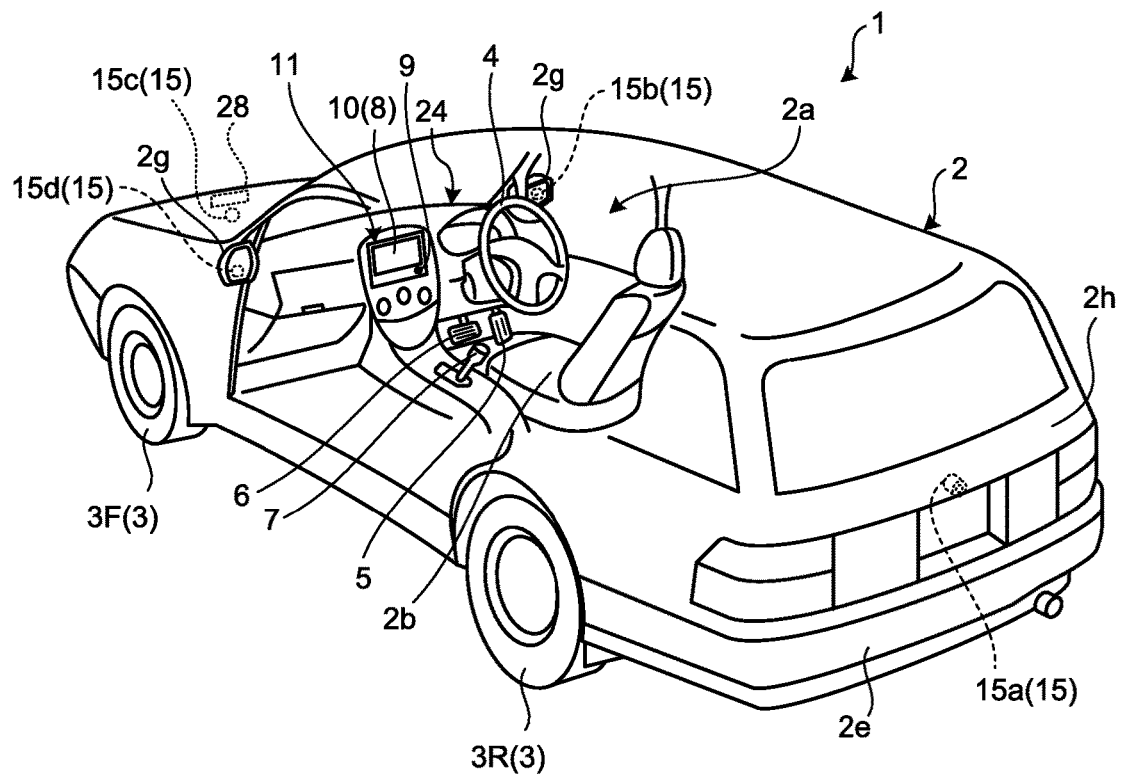

As illustrated in FIG. 1, a vehicle body 2 configures a vehicle chamber 2a in which a passenger, which is not illustrated, gets on. In the vehicle chamber 2a, a steering wheel unit 4, an accelerating operation unit 5, a braking operation unit 6, a speed change operation unit 7, and the like are provided so as to face a seat 2b of the driver serving as a passenger. For example, the steering wheel unit 4 is a steering wheel projected from a dashboard 24. For example, the accelerating operation unit 5 is an accelerator pedal located at the feet of the driver. For example, the braking operation unit 6 is a brake pedal located at the feet of the driver. For example, the speed change operation unit 7 is a shift lever projected from a center console. It is to be noted that the steering wheel unit 4, the accelerating operation unit 5, the braking operation unit 6, the speed change operation unit 7, and the like are not limited thereto.

Moreover, a display device 8 and a sound output device 9 are provided in the vehicle chamber 2a. For example, the display device 8 is a liquid crystal display (LCD), an organic electroluminescent display (OELD), and the like. For example, the sound output device 9 is a speaker. For example, the display device 8 is covered by a transparent operation input unit 10 such as a touch panel. The passenger can view an image displayed on a display screen of the display device 8 via the operation input unit 10. The passenger can also execute an input operation by operating the operation input unit 10 by touching, pushing, or moving the operation input unit 10 with a hand, a finger, or the like at a position corresponding to the image displayed on the display screen of the display device 8. For example, the display device 8, the sound output device 9, the operation input unit 10, and the like are mounted on a monitor device 11 placed at the center portion of the dashboard 24 in the vehicle width direction, in other words, the left-right direction. The monitor device 11 may include an operation input unit, which is not illustrated, such as a switch, a dial, a joy stick, and a push button. A sound output device, which is not illustrated, may be provided on another location in the vehicle chamber 2a different from where the monitor device 11 is provided. Sound may be output from the sound output device 9 in the monitor device 11 and the other sound output device. For example, the monitor device 11 may also act as a navigation system or an audio system.

Figure 2:
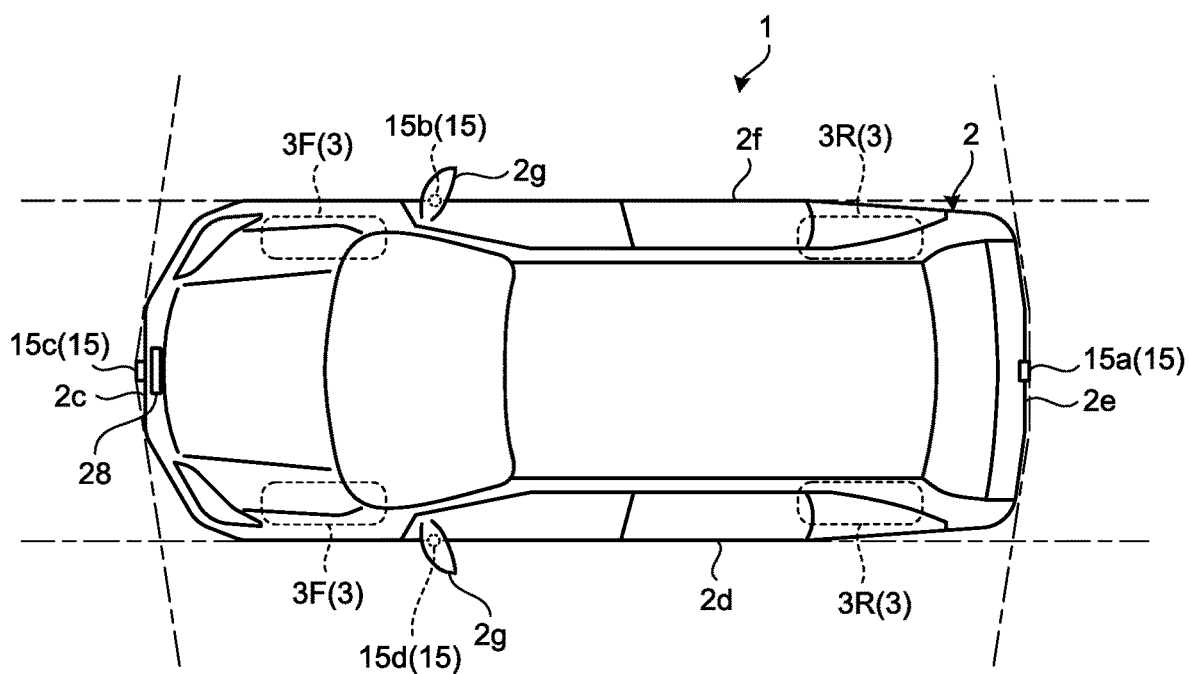
FIG. 2 is a plan view illustrating an example of the vehicle mounted with the periphery monitoring device according to the embodiment.
Figure 3:
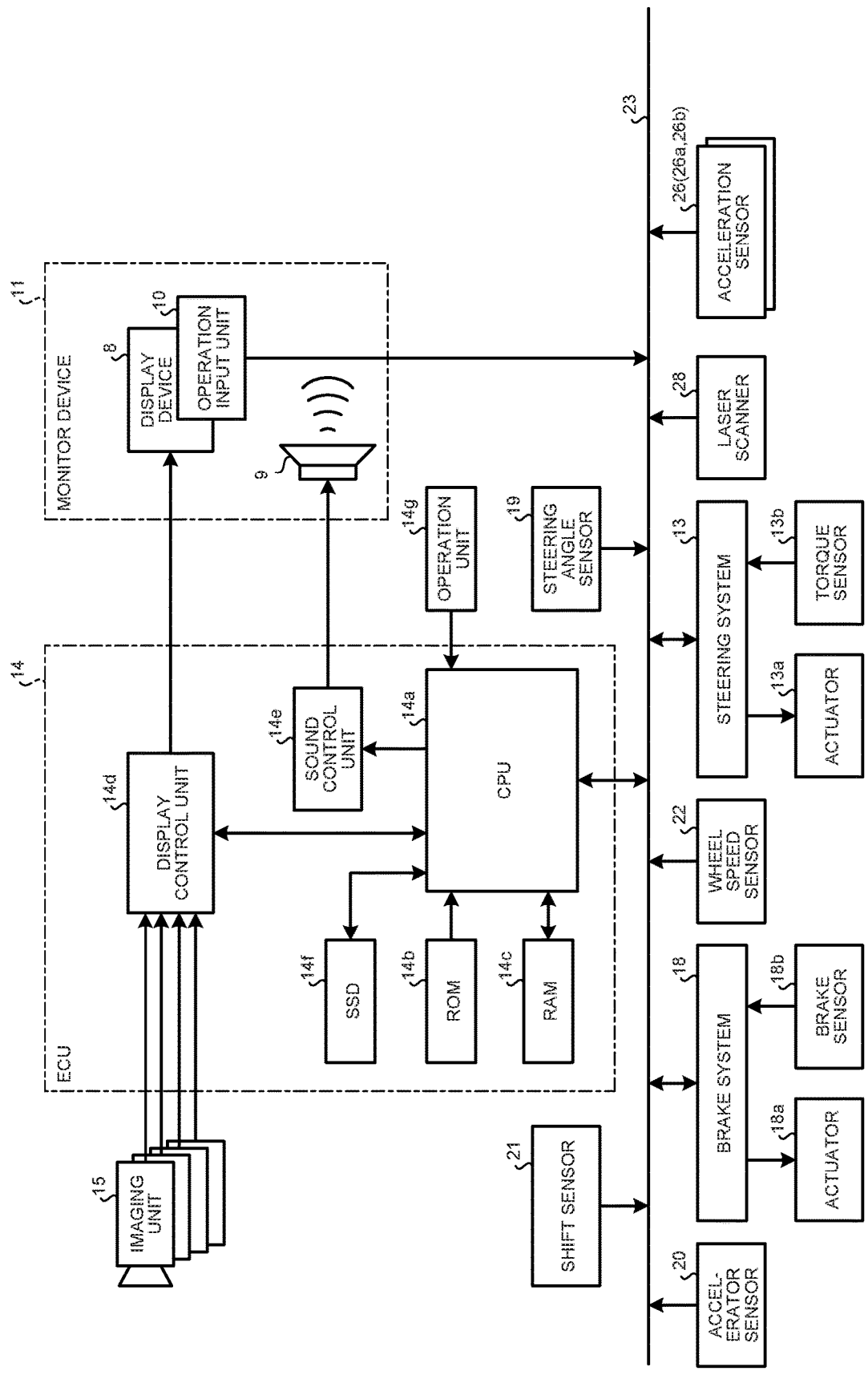
FIG. 3 is a block diagram illustrating an example of an image control system including the periphery monitoring device according to the embodiment.

As illustrated in FIG. 1 and FIG. 2, for example, the vehicle 1 is a four-wheeled automobile, and includes two left and right front wheels 3F and two left and right rear wheels 3R. The four wheels 3 are all configured to be steerable. As illustrated in FIG. 3, the vehicle 1 includes a steering system 13 for steering at least two of the wheels 3. The steering system 13 includes an actuator 13a and a torque sensor 13b. The steering system 13 is electrically controlled by an electronic control unit (ECU) 14 and the like, and operates the actuator 13a. For example, the steering system 13 is an electric power steering system, a steer-by-wire (SBW) system, and the like. The steering system 13 supports the steering wheel force by applying torque, in other words, assist torque to the steering wheel unit 4 by the actuator 13a. The steering system 13 also steers the wheels 3 by the actuator 13a. In this case, the actuator 13a may steer one of the wheels 3 or may steer the wheels 3. Moreover, for example, the torque sensor 13b detects torque applied to the steering wheel unit 4 by the driver.

Furthermore, as illustrated in FIG. 2, for example, four imaging units 15a to 15d are provided on the vehicle body 2 as a plurality of imaging units 15. For example, each of the imaging units 15 is a digital camera incorporating an imaging element such as a charge coupled device (CCD) and a complementary metal oxide semiconductor (CMOS) image sensor (CIS). The imaging unit 15 can output moving picture data (captured image data) at a predetermined frame rate. Each of the imaging units 15 includes a wide angle lens or a fisheye lens, and can photograph a range between 140 degrees and 220 degrees in the horizontal direction, for example. The optical axis of the imaging unit 15 may be set in the oblique downward direction. Thus, the imaging unit 15 successively photographs the external environment around the vehicle 1 including the road surface on which the vehicle 1 can move and the surrounding objects (obstacles, rocks, pits, and the like), and outputs the image as captured image data.

For example, the imaging unit 15a is placed on an end portion 2e at the rear side of the vehicle body 2, and provided on a wall portion below the rear window of a door 2h of a rear hutch. For example, an imaging unit 15b is placed on an end portion 2f at the right side of the vehicle body 2, and is provided on a door mirror 2g at the right side. For example, an imaging unit 15c is placed at the front side of the vehicle body 2, in other words, an end portion 2c at the front side of the vehicle in the front-rear direction, and is provided on a front bumper, a front grille, and the like. For example, the imaging unit 15d is placed at the left side of the vehicle body 2, in other words, an end portion 2d at the left side in the vehicle width direction, and is provided on a door mirror 2g at the left side. The ECU 14 that configures a periphery monitoring system 100 executes arithmetic processing and image processing on the basis of the captured image data obtained by the imaging units 15. The ECU 14 can also generate an image of a wider viewing angle, and generate a virtual bird's eye view image that is viewing the vehicle 1 from the above. Moreover, the ECU 14 can perform arithmetic processing and image processing on the data of the wide-angle image obtained by the imaging units 15, and generate an image of a specific area being cut out, generate image data only indicating a specific area, and generate image data only emphasizing a specific area. The ECU 14 can also convert (viewpoint conversion) the captured image data to virtual image data such that the image is picked up from a virtual viewpoint different from the viewpoint where the imaging unit 15 has picked up the image. For example, by displaying the acquired image data on the display device 8, the ECU 14 provides periphery monitoring information capable of confirming safety at the right-hand side and the left-hand side of the vehicle 1, and capable of confirming the surroundings of the vehicle 1 by looking down the vehicle 1 from above.

Moreover, as illustrated in FIG. 3, in the periphery monitoring system 100 (periphery monitoring device), not only the ECU 14, the monitor device 11, the steering system 13, and the like, but also a brake system 18, a steering angle sensor 19, an accelerator sensor 20, a shift sensor 21, a wheel speed sensor 22, acceleration sensors 26 (26a and 26b), a laser scanner 28, and the like are electrically connected via an in-vehicle network 23 serving as an electric communication line. For example, the in-vehicle network 23 is configured as a controller area network (CAN). The ECU 14 can control the steering system 13, the brake system 18, and the like by sending a control signal through the in-vehicle network 23. Moreover, the ECU 14 can receive detection results of the torque sensor 13b, a brake sensor 18b, the steering angle sensor 19, the accelerator sensor 20, the shift sensor 21, the wheel speed sensor 22, the acceleration sensors 26, the laser scanner 28, and the like; and an operation signal of the operation input unit 10 and the like via the in-vehicle network 23.

For example, the ECU 14 includes a central processing unit (CPU) 14a, a read only memory (ROM) 14b, a random access memory (RAM) 14c, a display control unit 14d, a sound control unit 14e, a solid state drive (SSD; flash memory) 14f, and the like. For example, the CPU 14a executes various computations and processing such as image processing relating to an image displayed on the display device 8, computation of a course index (estimated course line) indicating the estimated traveling direction of the vehicle 1, calculation of a gradient state of the road surface, and notification processing to warn the driver to pay attention to the gradient. The CPU 14a reads out a program stored (installed) in a nonvolatile storage device such as the ROM 14b, and executes arithmetic processing according to the program.

The RAM 14c temporarily stores therein various types of data used in the computation performed by the CPU 14a. Moreover, the display control unit 14d mainly executes image processing using the captured image data obtained by the imaging unit 15, image processing on image data displayed by the display device 8 (for example, image composition), and the like, within the arithmetic processing in the ECU 14. Furthermore, the sound control unit 14e mainly executes processing on the sound data output by the sound output device 9, within the arithmetic processing in the ECU 14. Still furthermore, the SSD 14f is a rewritable nonvolatile storage unit, and can store data even if the power of the ECU 14 is turned OFF. The CPU 14a, the ROM 14b, the RAM 14c, and the like may be accumulated in the same package. Still furthermore, in the ECU 14, another logical operation processor such as a digital signal processor (DSP), a logical circuit, and the like may also be used instead of the CPU 14a. Still furthermore, a hard disk drive (HDD) may be provided instead of the SSD 14f, or the SSD 14f and the HDD may be separately provided from the ECU 14 for monitoring periphery.

For example, the brake system 18 includes an anti-lock brake system (ABS) that prevents the brake from locking, an electronic stability control (ESC) that prevents the vehicle 1 from skidding during cornering, an electric brake system that increases the brake force (performs brake assist), a brake-by-wire (BBW), and the like. The brake system 18 applies braking force to the wheels 3, eventually, to the vehicle 1 via an actuator 18a. Moreover, the brake system 18 can execute various controls by detecting the locking up of the brake, idling of the wheels 3, signs of skidding, and the like from a rotation difference between the left and right wheels 3. For example, the brake sensor 18b is a sensor for detecting the position of a movable part of the braking operation unit 6. The brake sensor 18b can detect the position of a brake pedal serving as the movable part. The brake sensor 18b includes a displacement sensor.

For example, the steering angle sensor 19 is a sensor for detecting the steering amount of the steering wheel unit 4 such as the steering wheel. For example, the steering angle sensor 19 is configured using a Hall element and the like.

The ECU 14 executes various controls by obtaining the steering amount of the steering wheel unit 4 by the driver, the steering amount of each of the wheels 3 during automatic steering, and the like from the steering angle sensor 19. The steering angle sensor 19 detects the rotation angle of a rotating portion included in the steering wheel unit 4. The steering angle sensor 19 is an example of an angle sensor.

For example, the accelerator sensor 20 is a sensor for detecting the position of a movable part of the accelerating operation unit 5. The accelerator sensor 20 can detect the position of the accelerator pedal serving as the movable part. The accelerator sensor 20 includes a displacement sensor.

For example, the shift sensor 21 is a sensor for detecting the position of a movable part in the speed change operation unit 7. The shift sensor 21 can detect the position of a lever, an arm, a button, and the like serving as the movable part. The shift sensor 21 may include a displacement sensor, or may be configured as a switch.

The wheel speed sensor 22 is a sensor for detecting the rotation amount of the wheels 3 and the rotation speed per unit time. The wheel speed sensor 22 outputs the number of wheel speed pulses indicating the detected rotation speed, as a sensor value. For example, the wheel speed sensor 22 may be configured using a Hall element and the like. The ECU 14 executes various controls by computing a moving amount of the vehicle 1 and the like on the basis of the sensor value obtained from the wheel speed sensor 22. The wheel speed sensor 22 may also be provided in the brake system 18. In this case, the ECU 14 obtains the detection result of the wheel speed sensor 22 via the brake system 18.

For example, two acceleration sensors 26 (26a and 26b) are provided in the vehicle 1. The ECU 14 calculates the inclination of the vehicle 1 in the front-rear direction (pitch angle) and the inclination of the vehicle 1 in the left-right direction (roll angle), on the basis of a signal from the acceleration sensors 26 (26a and 26b). The pitch angle is an angle indicating the inclination of the vehicle 1 around the lateral axis. The pitch angle is 0 degree when the vehicle 1 is present on the horizontal surface (ground surface and road surface). The roll angle is an angle indicating the inclination of the vehicle 1 around the front-rear axis. The roll angle is 0 degree when the vehicle 1 is present on the horizontal surface (ground surface and road surface). In other words, whether the vehicle 1 is present on a horizontal road surface, or present on an inclined plane (road surface with ascending gradient or road surface with descending gradient) can be detected. When the ESC is mounted on the vehicle 1, the acceleration sensors 26 (26a and 26b) conventionally mounted on the ESC will be used. In the present embodiment, the acceleration sensor is not limited, and the acceleration sensor may be any sensor as long as the sensor can detect the acceleration of the vehicle 1 in the front-rear and left-right directions.

For example, the laser scanner 28 is provided on a front-side vehicle body (end portion 2c at the front side of the vehicle in the front-rear direction) of the vehicle body 2, and acquires state information indicating the state of the road surface in the traveling direction of the vehicle 1. In the laser scanner 28, laser light emitted from a light source (laser diode and the like) inside the sensor is reflected when the laser light hits an object to be measured (for example, a road surface or a three-dimensional object), and is received by a light receiving element. The laser scanner 28 calculates the distance to the position where the laser light is reflected, by evaluating and calculating the received reflected light. As a result, the ECU 14 obtains relative state information (gradient information and relative inclination) with reference to the road surface in front of the vehicle 1 based on the road surface on which the vehicle 1 is present such as a state of the road surface, the presence of a gradient, the position of the gradient (gradient position), the size of the gradient (gradient value), and a state of the gradient (ascending gradient or descending gradient).

Figure 4:
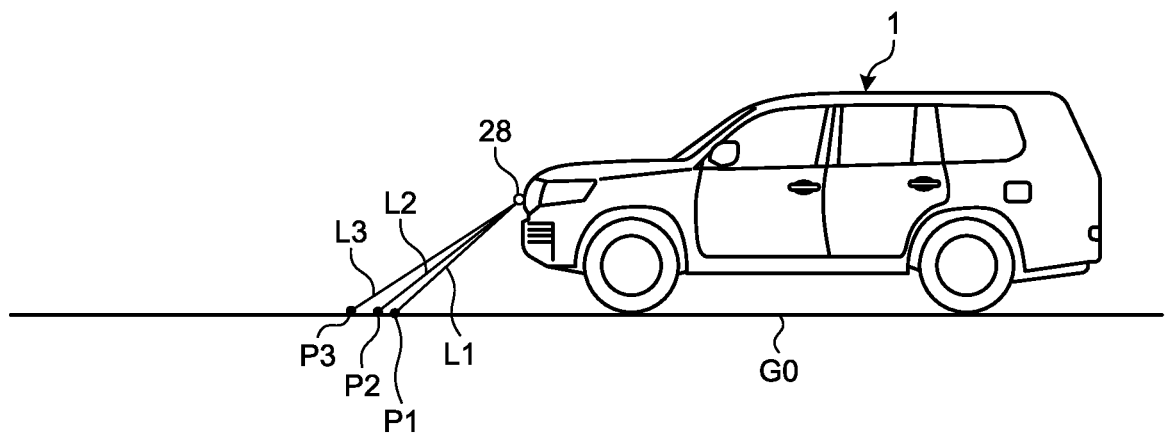
FIG. 4 is an explanatory diagram of an example of gradient detection by a laser scanner installed in the periphery monitoring device according to the embodiment, and illustrating a detection point of laser light when the road surface in front of the vehicle is horizontal.

An example of obtaining state information of a road surface by the laser scanner 28 will be described with reference to FIG. 4 to FIG. 6. The laser scanner 28 emits a plurality (for example, three) of laser beams toward the road surface of a predetermined distance (for example, two meters) in front of the vehicle 1. The optical passages of laser beams L1, L2, and L3 are adjusted so as to slightly shift in the front-rear direction of the vehicle 1. In this state, the laser scanner 28 scans the laser beams L1, L2, and L3 in the vehicle width direction. In this process, for example, as illustrated in FIG. 4, when the vehicle 1 is present on a horizontal road surface G0, each of the laser beams L1, L2, and L3 is reflected at a predetermined position and returns to a light receiving unit, because the laser scanner 28 is fixed to the vehicle 1. In other words, the time difference from when each of the laser beams L1, L2, and L3 is emitted to when each of the laser beams L1, L2, and L3 is received is a predetermined value. By analyzing the time difference, it is possible to calculate distances to detection points P1, P2, and P3. When the calculated distance is assumed to match with the predetermined distance, it is possible to detect that the detection points P1, P2, and P3 are on the horizontal road surface G0, in other words, the road surface reflecting the detection points P1, P2, and P3 is the horizontal road surface G0.

Figure 5:
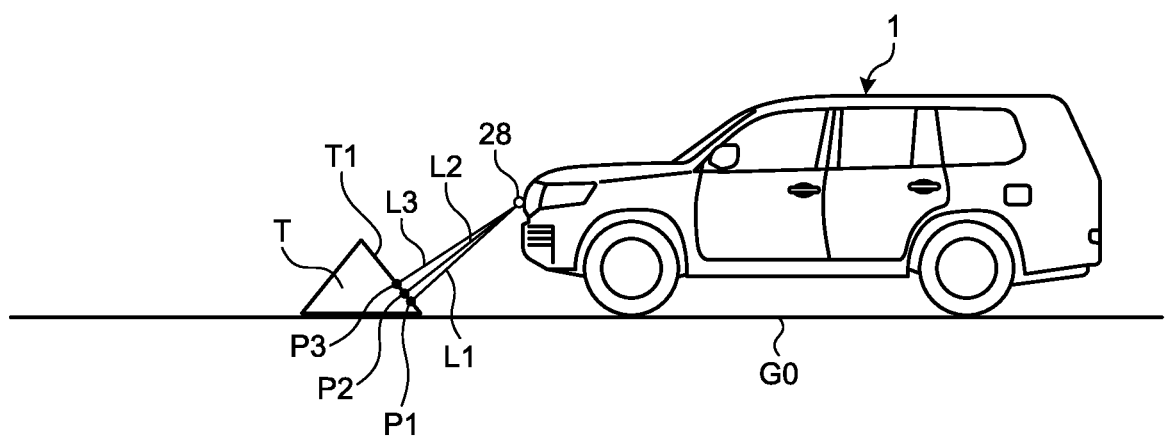
FIG. 5 is an explanatory diagram of an example of gradient detection by the laser scanner installed in the periphery monitoring device according to the embodiment, and illustrating a detection point of laser light when a three-dimensional object is on the road surface in front of the vehicle.

As illustrated in FIG. 5, when a three-dimensional object T (for example, a rock) is in front of the vehicle 1, there is an ascending gradient in front of the vehicle 1. In this case also, the laser beams L1, L2, and L3 are reflected by a surface T1 of the three-dimensional object T, and returns to the light receiving unit of the laser scanner 28. In other words, a time difference from when the laser beams L1, L2, and L3 are emitted to when the laser beams L1, L2, and L3 are received is different from that when the laser beams L1, L2, and L3 are reflected by the horizontal road surface G0 illustrated in FIG. 4. By analyzing the time difference, it is possible to detect the distance to the three-dimensional object T, in other words, the position of the gradient. Moreover, depending on the degree of the gradient (gradient value and gradient angle), the time from when each of the laser beams L1, L2, and L3 is reflected to when each of the laser beams L1, L2, and L3 returns differs. By analyzing the time difference, it is possible to detect the gradient of the surface T1 on which the detection points P1, P2, and P3 are present.

Figure 6:
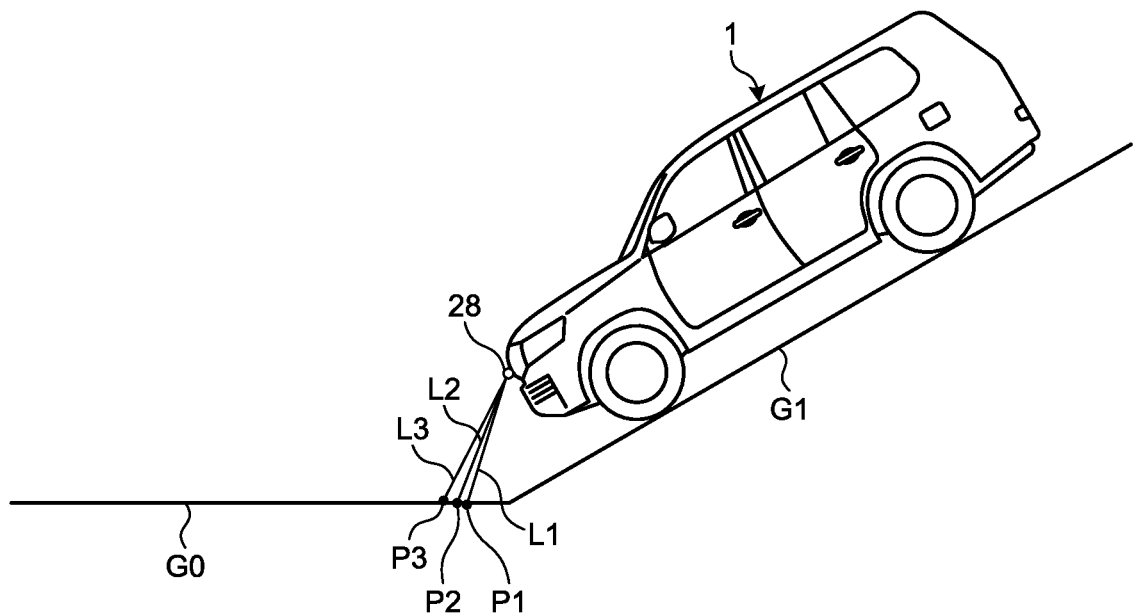
FIG. 6 is an explanatory diagram of an example of gradient detection by the laser scanner installed in the periphery monitoring device according to the embodiment, and illustrating a detection point of laser light when the gradient of the road surface in front of the vehicle is changing.

FIG. 6 is when the vehicle 1 is present on a road surface G1 with descending gradient, and the horizontal road surface G0 is in front of the vehicle 1. In this case, when using, as reference, the road surface G1 on which the vehicle 1 is currently present, the gradient is changed at a portion connected to the horizontal road surface G0 in front of the vehicle 1. In this case also, the time difference from when the laser beams L1, L2, and L3 are emitted to when the laser beams L1, L2, and L3 are received differs from that when the laser beams L1, L2, and L3 are reflected by the horizontal road surface G0 in FIG. 4. In this process, the ECU 14 can detect the posture of the vehicle 1, in other words, whether the vehicle 1 is currently present on the ascending gradient or on the descending gradient, on the basis of the output signal of the acceleration sensors 26. It is possible to detect the gradient degree (gradient value), the position of the gradient, the changing state of the gradient, and the like with reference to the vehicle 1, on the basis of the time difference up to when each of the laser beams L1, L2, and L3 is received. In this manner, by using the laser scanner 28, it is possible to detect the gradient value and gradient position of the road surface in front of the vehicle 1.

The configurations, arrangements, electric connection mode, and the like of the various sensors and the actuators described above are merely examples, and may be set (changed) in various manners. For example, the gradient may also be detected by providing a stereo camera instead of the laser scanner 28.

Figure 7:
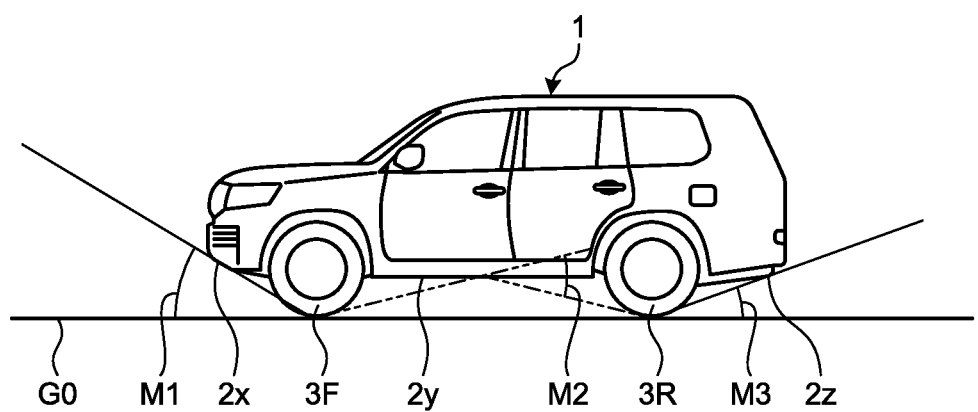
FIG. 7 is a diagram for explaining an approach angle, a ramp breakover angle, and a departure angle of the vehicle mounted with the periphery monitoring device according to the embodiment.

About how much of the gradient road surface the vehicle 1 can travel is determined at the design stage. For example, as illustrated in FIG. 7, an approach angle M1, a ramp breakover angle M2, a departure angle M3 are set for the vehicle 1 including a four-wheeled drive vehicle that may travel on a road surface with a steep slope such as an uneven road. The approach angle M1 is an angle from the ground contact point of the front wheels 3F to the front end of a front bumper 2x. When the vehicle 1 is to climb an inclined plane or climb over an obstacle, the approach angle M1 is used as an indication of whether the front bumper 2x comes into contact with the inclined plane or the obstacle. When straight lines extending from the ground contact points of the front wheels 3F and the rear wheels 3R are intersected at a vehicle body bottom portion 2y at the center of the wheelbase, the ramp breakover angle M2 is an angle between the intersected straight lines in the vertical direction. When the vehicle 1 is to climb over the top of the inclined plane or an obstacle, the ramp breakover angle M2 is used as an indication of whether the vehicle body bottom portion 2y comes into contact with the top of the inclined plane or the obstacle. The departure angle M3 is an angle from the ground contact point of the rear wheels 3R to the rear end of a rear bumper 2z. When the vehicle 1 is to climb an inclined plane or climb over an obstacle, the departure angle M3 is used as an indication of whether the rear bumper 2z comes into contact with the inclined plane or the obstacle.

Figure 8:
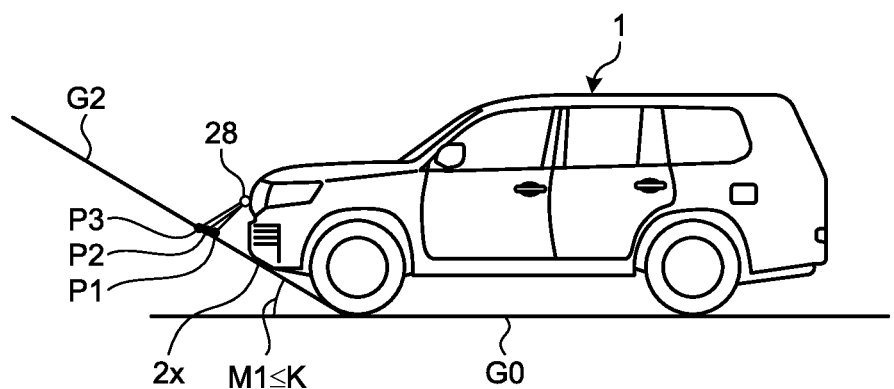
FIG. 8 is an explanatory diagram when the vehicle mounted with the periphery monitoring device according to the embodiment is to climb an ascending gradient.

When the vehicle 1 enters the road surface the angle (gradient) of which exceeds the approach angle M1, the ramp breakover angle M2, or the departure angle M3, the vehicle 1 may be unable to travel because the wheels 3 are lifted up from the road surface and the driving force of the wheels 3 is not transmitted to the road surface. For example, as illustrated in FIG. 8, the vehicle 1 traveling on the horizontal road surface G0 is about to enter a road surface G2 with ascending gradient. When the gradient difference between the road surface G2 and the road surface G0, in other words, when the gradient (gradient angle K) with reference to the vehicle 1 is equal to or larger than the approach angle M1, the vehicle 1 may be unable to travel, because the front bumper 2x comes into contact with the road surface G2. Thus, the ECU 14 obtains the gradient value on the basis of the detection points P1, P2, and P3 by the laser scanner 28. For example, the laser scanner 28 that detects the detection points P1, P2, and P3 at the positions two meters ahead of the vehicle 1 when the vehicle 1 is traveling on the horizontal road surface G0 as illustrated in FIG. 4, detects the detection points P1, P2, and P3 at the closer positions. Consequently, the ECU 14 can calculate the gradient angle K at a state as illustrated in FIG. 8 (gradient angle K of the ascending gradient ahead, when using, as reference, the road surface G0 on which the vehicle 1 is present), on the basis of the distance to the detection points P1, P2, and P3 detected by the laser scanner 28. In other words, it is possible to obtain the relative inclination (gradient angle K) of the road surface G2 in front of the vehicle 1 using, as reference, the road surface G0 on which the vehicle 1 is present. In this case, the ECU 14 can detect that there is a road surface having different features (for example, an ascending gradient and a projected obstacle such as a rock and an ascending step) from those of a road surface on which the vehicle 1 is present, in front of the vehicle 1 at the time point when the distance to the detection point P3 is first decreased.

Figure 9:
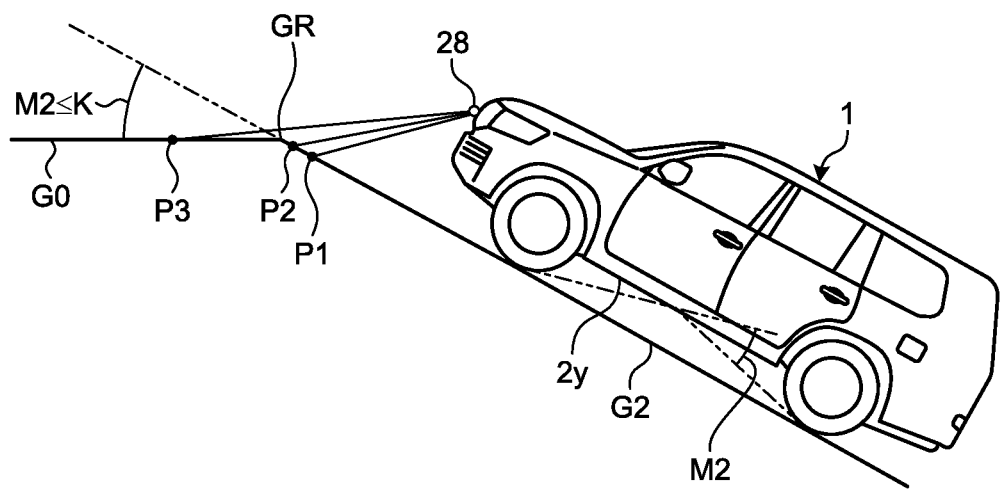
FIG. 9 is an explanatory diagram when the vehicle mounted with the periphery monitoring device according to the embodiment is to proceed to the horizontal road surface from the ascending gradient.

FIG. 9 is an example illustrating a road surface structure different from that in FIG. 8. For example, in FIG. 9, the vehicle 1 traveling the road surface G2 with ascending gradient is about to enter the horizontal road surface G0 connected by a connection portion GR. In this case also, when the gradient difference between the road surface G0 and the road surface G2, in other words, when the gradient (gradient angle K) with reference to the vehicle 1 is equal to or larger than the ramp breakover angle M2, the vehicle 1 may be unable to travel because the vehicle body bottom portion 2y may come into contact with the connection portion GR between the road surface G2 and the road surface G0. In this case, for example, when the vehicle 1 is traveling the road surface G2, as illustrated in FIG. 4, the laser scanner 28 detects the detection points P1, P2, and P3 two meters ahead of the vehicle 1. Then, for example, when the vehicle 1 continues to travel, as illustrated in FIG. 9, the laser scanner 28 detects the detection point P3 at the position ahead of the connection portion GR. Thus, the ECU 14 can detect the presence of the road surface G0 having different features from those of the road surface G2 on which the vehicle 1 is present, in front of the vehicle 1, on the basis of the distance (detection state) to the detection points P1, P2, and P3 obtained by the laser scanner 28. Moreover, in this case, the ECU 14 can calculate the gradient angle K (gradient angle K of the descending gradient ahead of the vehicle 1, when using, as reference, the road surface G2 on which the vehicle 1 is present) based on the distance to the detection points P1, P2, and P3. In other words, a relative inclination (gradient angle K) of the road surface G0 in front of the vehicle 1 using, as reference, the road surface G2 on which the vehicle 1 is present can be obtained. The ECU 14 can recognize the posture of the vehicle 1 on the basis of the detection value of the acceleration sensors 26. Consequently, as illustrated in FIG. 9, it is possible to detect that there is the road surface G0 with the gradient angle K relative to the road surface G2, ahead of the road surface G2 with ascending gradient.

Figure 10:
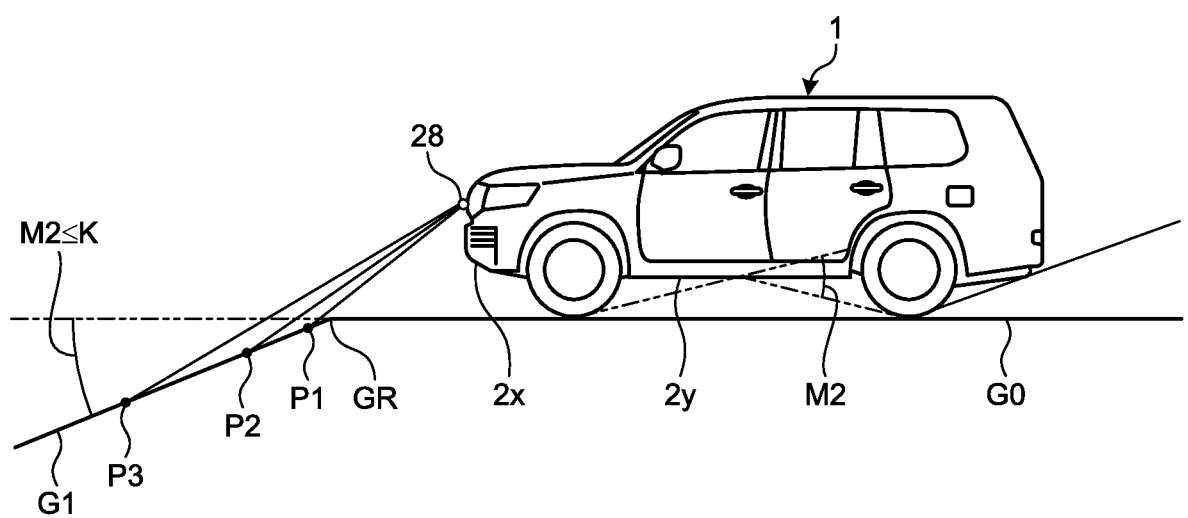
FIG. 10 is an explanatory diagram when the vehicle mounted with the periphery monitoring device according to the embodiment is to go down a descending gradient from the horizontal road surface.

FIG. 10 is an example illustrating a road surface structure opposite from that in FIG. 9. In FIG. 10, the vehicle 1 traveling the horizontal road surface G0 is about to enter the road surface G1 with descending gradient connected with the connection portion GR. In this case also, when the gradient difference between the road surface G0 and the road surface G1, in other words, the gradient (gradient angle K) with reference to the vehicle 1 is equal to or larger than the ramp breakover angle M2, the vehicle 1 may be unable to travel because the vehicle body bottom portion 2y may come into contact with the connection portion GR between the road surface G0 and the road surface G1. For example, as illustrated in FIG. 10, when the vehicle 1 continues to travel, the light receiving unit of the laser scanner 28 detects the detection points P1, P2, and P3 on the road surface G1 beyond the connection portion GR. In other words, the detection points P1, P2, and P3 detected two meters ahead of the vehicle 1 when the vehicle 1 is traveling the road surface G0 are detected at positions further away. Consequently, the ECU 14 can detect that there is the road surface G1 having different features from those of the road surface G0 on which the vehicle 1 is present in front of the vehicle 1, on the basis of the distance (detection state) to the detection points P1, P2, and P3 obtained by the laser scanner 28. Moreover, the ECU 14 can calculate the gradient angle K (gradient K with descending gradient in front of the vehicle 1, when using, as reference, the road surface G0 on which the vehicle 1 is present) on the basis of the distance to the detection points P1, P2, and P3. In other words, it is possible to obtain the relative inclination (gradient angle K) of the road surface G1 in front of the vehicle 1, using, as reference, the road surface G0 on which the vehicle 1 is present. In this case also, the ECU 14 can acquire the posture of the vehicle 1 on the basis of the detection value of the acceleration sensors 26. Thus, as illustrated in FIG. 10, it is also possible to detect that there is the road surface G1 with the gradient angle K relative to the road surface G0, ahead of the horizontal road surface G0. In this case also, similar to FIG. 9, the ECU 14 can detect that there is a road surface having different features from those of the road surface on which the vehicle 1 is present, in front of the vehicle 1, at the time point when the distance to the detection point P3 is first increased.

Conventionally, when the gradient of the road surface on which the vehicle 1 is traveling is changed, the driver determines whether the vehicle 1 can enter and travel the road surface with the changed gradient, by visually confirming the gradient state (irregularity state, up and down state, and the like), and by confirming the image displayed on the display device 8. Thus, the determination may take time, and a misjudgment can occur. Consequently, for example, when there is a gradient on the road surface such as the inclined plane and irregularity, the ECU 14 that implements the periphery monitoring system 100 of the present embodiment detects the size of the gradient (gradient value) and the position of the gradient, compares the gradient value of the road surface with the reference gradient value at which the vehicle 1 can pass, and notifies the driver of the comparison result. As an example of the notification mode, the display device 8 is used for notification. For example, the ECU 14 may have a function of detecting the steering angle of the vehicle 1 from the detection result of the steering angle sensor 19, and displaying a route index indicating the estimated traveling direction of the wheels 3 (front wheels 3F) on the display device 8, on the basis of the steering angle. More specifically, for example, the ECU 14 displays an image based on the captured image data picked up by the imaging unit 15 such as an image of the traveling direction of the vehicle 1, on the display device 8. To superimpose the route index on the image, the ECU 14 adds and displays the gradient information of the road surface. Consequently, the ECU 14 can notify the driver whether the vehicle 1 can travel the road surface toward which the vehicle 1 is about to proceed, and allows the driver to determine whether to proceed and whether the vehicle 1 can travel the road surface.

Figure 11:
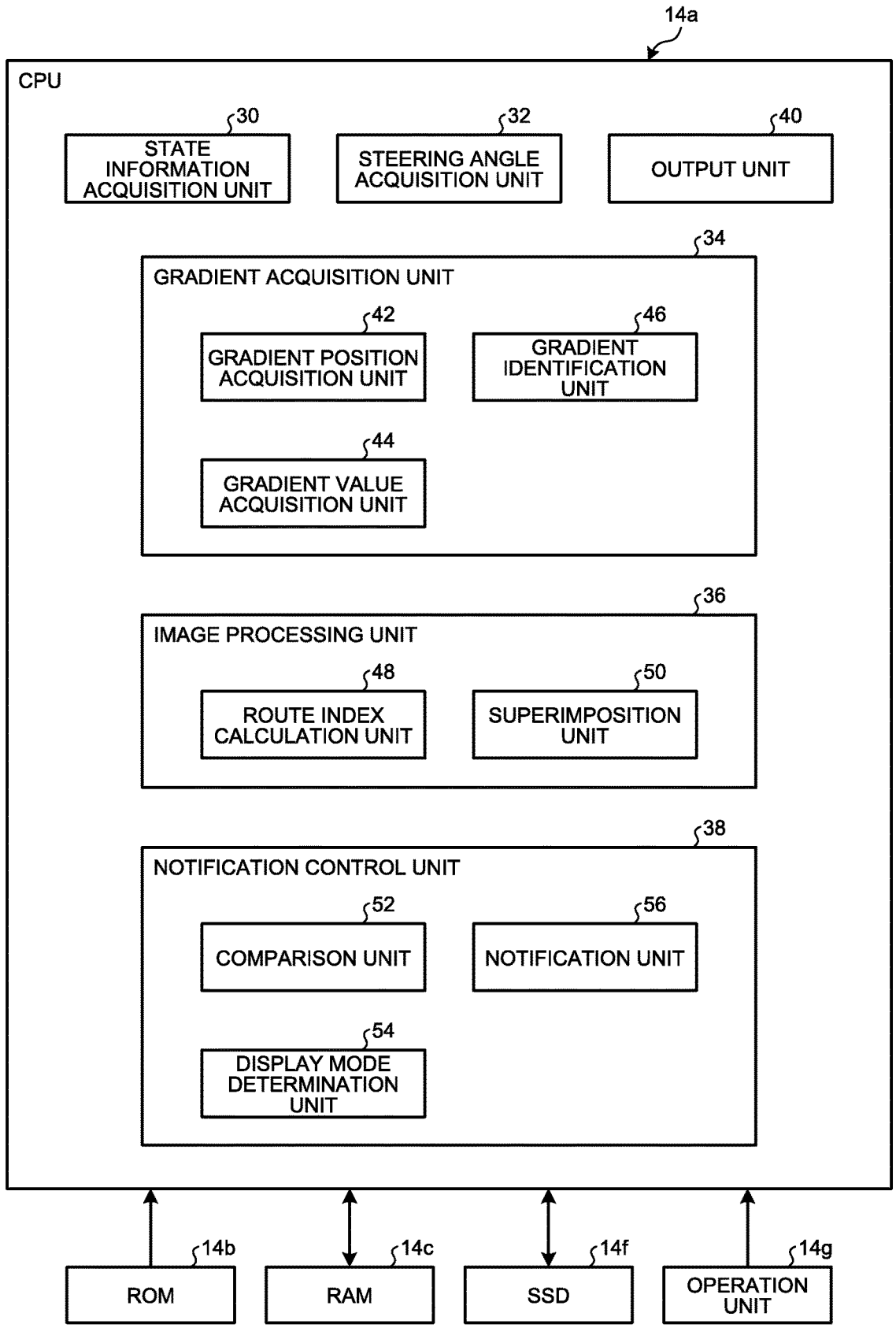
FIG. 11 is a block diagram illustrating an example of a configuration of a control unit (CPU) for implementing notification of the gradient information, implemented in an ECU of the periphery monitoring device according to the embodiment.

As illustrated in FIG. 11, to implement the notification with the gradient information as described above, the CPU 14a in the ECU 14 includes a state information acquisition unit 30, a steering angle acquisition unit 32, a gradient acquisition unit 34, an image processing unit 36, a notification control unit 38, an output unit 40, and the like. The gradient acquisition unit 34 includes a gradient position acquisition unit 42, a gradient value acquisition unit 44, a gradient identification unit 46, and the like. Moreover, the image processing unit 36 includes a route index calculation unit 48, a superimposition unit 50, and the like. The notification control unit 38 includes a comparison unit 52, a display mode determination unit 54, a notification unit 56, and the like. These modules can be implemented when each of the modules reads out a program installed and stored in a storage device such as the ROM 14b, and executes the program.

The state information acquisition unit 30 acquires state information indicating the state of the road surface in the traveling direction of the vehicle 1. For example, the state information acquisition unit 30 acquires information on the detection points P1, P2, and P3 output from the laser scanner 28 via the in-vehicle network 23. Moreover, the state information acquisition unit 30 acquires captured image data output from the imaging unit 15 that is provided in the vehicle 1 and that images the surrounding image of the vehicle 1, via the display control unit 14d. Furthermore, the state information acquisition unit 30 acquires the acceleration output from the acceleration sensors 26, to acquire the pitch angle and the roll angle indicating the posture of the vehicle 1. The display control unit 14d may output the captured image data picked up by the imaging unit 15 to the display device 8 as it is, when only the periphery image of the vehicle 1 is displayed on the display device 8. Moreover, the CPU 14a may let the driver select a desirable display content, using an input device such as the operation input unit 10 and an operation unit 14g. In other words, the display control unit 14d can selectively display the image that is selected by operating the operation input unit 10 and the operation unit 14g. For example, it is possible to display a rear image of the vehicle 1 picked up by the imaging unit 15a on the display device 8, and a left side image picked up by the imaging unit 15d.

The steering angle acquisition unit 32 acquires information on the operation state of the steering wheel unit 4 (steering wheel) output from the steering angle sensor 19. In other words, the steering angle acquisition unit 32 acquires the route information in the direction toward which the driver is about to drive the vehicle 1.

The gradient acquisition unit 34 acquires the state of the gradient of the road surface in front of the traveling direction of the vehicle 1, on the basis of the detection result of the laser scanner 28 acquired by the state information acquisition unit 30, as described in FIG. 4 to FIG. 8 and in FIG. 8 to FIG. 10. For example, as described in FIG. 4 and FIG. 5, the gradient position acquisition unit 42 detects the position of the gradient on the road surface, on the basis of the distances to the detection points P1, P2, and P3 output from the laser scanner 28. Moreover, as described in FIG. 4, the gradient value acquisition unit 44 calculates the size (gradient value and gradient angle) of the gradient on the basis of the distances to the detection points P1, P2, and P3 output from the laser scanner 28. As described in FIG. 8 to FIG. 10, the gradient identification unit 46 identifies whether a road surface in front of the vehicle 1 is a road surface with relatively ascending gradient or a road surface with descending gradient, on the basis of the detection result of the detection points P1, P2, and P3 of the laser scanner 28. When the distance to the detection points P1, P2, and P3 is shorter than that when there is no gradient, the gradient identification unit 46 identifies the road surface as the ascending gradient. Alternatively, when the distance to the detection points P1, P2, and P3 is longer than that when there is no gradient, the gradient identification unit 46 identifies the road surface as the descending gradient. The gradient acquisition unit 34 acquires a relative inclination (relative gradient value) of the road surface in front of the vehicle 1, using, as reference, the road surface on which the vehicle 1 is present, on the basis of the detection result of the laser scanner 28. Moreover, it is possible to obtain inclination (absolute gradient value) with respect to horizontal of the road surface toward which the vehicle 1 is about to proceed, by adding the detection result of the laser scanner 28 and the inclination (posture) of the vehicle 1 (the concerned vehicle) relative to the current road surface, on the basis of the detection result of the acceleration sensors 26.

The image processing unit 36 performs a process of adding various types of information on the front image of the vehicle 1, on the basis of the captured image data output from the imaging unit 15c. The route index calculation unit 48 calculates a route index indicating the estimated traveling direction of the front wheels 3F of the vehicle 1, on the basis of the detection result of the steering angle sensor 19 (steering angle (steering wheel angle) of the vehicle 1) acquired by the steering angle acquisition unit 32 via the in-vehicle network 23. For example, the route index is a guide line that acquires a direction toward which the vehicle 1 turns (direction that the front wheels 3F pass) on the basis of the steering angle of the front wheels 3F, and that extends from the front wheels 3F along the acquired direction to two meters ahead, for example. The route index can indicate the traveling direction of the vehicle 1 specified by the steering wheel unit 4, because the route index moves with the steering wheel direction and the steering angle of the steering wheel unit 4 (detection result of the steering angle sensor 19). Moreover, the route index may have substantially the same width as that of the wheels 3. In this case, when the vehicle 1 advances along the route index, the actual wheels 3 pass the position (road surface) on the image superimposed with the route index. Consequently, by displaying the route index, the driver can easily imagine the passing state of the wheels 3 from then on. The superimposition unit 50 superimposes the route index calculated by the route index calculation unit 48 on an image (actual image) on the basis of the captured image data picked up by the imaging unit 15 in addition to the detection result of the steering angle sensor 19. For example, the display color of the route index may be determined and superimposed, according to the notification content based on the gradient value.

Figure 12:
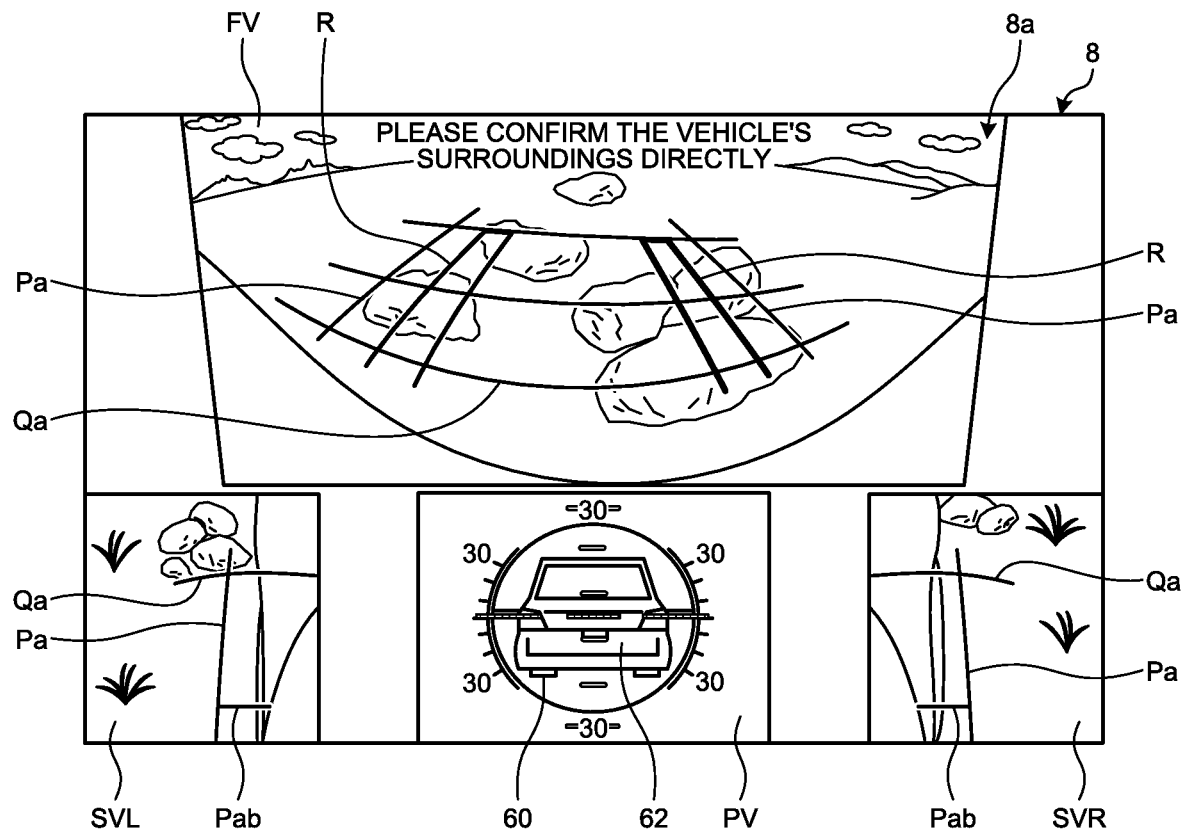
FIG. 12 is a diagram for explaining an example of a display screen that displays gradient information by the periphery monitoring device according to the embodiment.

FIG. 12 illustrates a screen 8a including a route index R as a display example of the display device 8. As illustrated in FIG. 12, in the display device 8, a display area is divided into a plurality of display areas. The display device 8 displays images of various directions, a clinometer 60 indicating the posture of the vehicle 1, and the like. For example, a front display area FV is disposed at the upper center portion of the display area in the display device 8. A left side display area SVL is disposed below and to the left of the front display area FV. A right side display area SVR is disposed below and to the right of the front display area FV. Moreover, a posture display area PV for displaying the clinometer 60 is disposed below the front display area FV. The route index R indicating the estimated traveling direction of the vehicle 1, a front reference line Qa indicating an indication of distance from the end portion 2c at the front side of the vehicle body 2, a side reference line Pa indicating an indication of distance from the end portions 2d and 2f at the sides of the vehicle body 2, and the like are displayed in a superimposed manner. The front reference line Qa and the side reference line Pa are also superimposed on the left side display area SVL and the right side display area SVR. Consequently, the front display area FV, the left side display area SVL, and the right side display area SVR are correspondingly displayed so as to be easily understood. A ground line Pab indicating the grounding position of the front wheels 3F is applied on the side reference line Pa in the left side display area SVL and the right side display area SVR so that the position of the front wheels 3F can be easily understood. The clinometer 60 displays the inclination of the vehicle 1 in the left-right direction (roll angle) and the inclination of the vehicle 1 in the front-rear direction (pitch angle) in the posture of a symbol 62, on the basis of a signal from the acceleration sensors 26 (26a and 26b).

The notification control unit 38 notifies the driver that there is a gradient on the road surface that may cause the vehicle 1 to be unable to travel, when a gradient difference between the road surface on which the vehicle 1 is currently present and the road surface toward which the vehicle 1 is to about to proceed, in other words, a gradient (gradient angle K) with reference to the vehicle 1, is equal to or larger than the approach angle M1, for example, according to the gradient value acquired by the gradient value acquisition unit 44 and the posture (inclination) of the vehicle 1 with respect to horizontal.

The comparison unit 52 compares the relative gradient value K calculated by the gradient value acquisition unit 44 with the reference gradient value based on the approach angle M1, the ramp breakover angle M2, or the like that is stored in advance in the storage device such as the ROM 14b and the SSD 14f and that is determined at the design stage of the vehicle 1. The comparison unit 52 then detects whether there is a gradient whose notification should be made, on the road surface toward which the vehicle 1 is about to proceed. Moreover, as described above, by adding the gradient value K calculated by the gradient value acquisition unit 44 and the inclination of the vehicle 1 (the concerned vehicle) calculated from the detection result of the acceleration sensors 26, the gradient acquisition unit 34 can acquire the gradient value (absolute gradient value) with respect to horizontal. By comparing between the absolute value of the gradient and the climbing ability (descending ability) of the vehicle 1, the comparison unit 52 can detect whether the gradient is close to the climbing ability (descending ability), or whether the gradient exceeds the climbing ability (descending ability). In this case, the comparison unit 52 detects whether there is a gradient that may exceed the climbing ability (descending ability)(the vehicle 1 may be unable to travel) and whose notification should be made, on the road surface, when the vehicle 1 continues to travel as is.

The display mode determination unit 54 determines the notification mode to be displayed on the display device 8 on the basis of the comparison result, when the comparison unit 52 detects the gradient whose notification should be made. For example, when the notification is performed by changing the display color of the route index R, the display color of the route index R is set to "red", when there is a strong possibility that the vehicle 1 will not be able to travel. Moreover, the display color of the route index R is set to "orange", when the vehicle 1 can travel but the driver needs to pay full attention. Furthermore, the display color of the route index R is set to "yellow", when there is a gradient the driver should pay attention. For example, the route index R is displayed in a normal color such as "blue" or "white", when there is an irregularity, but the irregularity cannot be identified as a gradient, or when notification is not necessarily required. Even when the route index R is displayed in the normal color, the route index R is displayed on the actual image picked up by the imaging unit 15 in a superimposed manner. Consequently, it is possible to let the driver easily identify the state of the road surface toward which the vehicle 1 is about to proceed, and guide the driver to travel safely. In this manner, by changing the display mode and performing stepwise notification, it is possible to easily warn the driver to pay attention. Moreover, because notification is not made depending on the circumstances, it is possible to display the notification without making the driver annoyed by the excessive notification. The display mode determination unit 54 can also display according to the display mode set by the user using the operation input unit 10, the operation unit 14g, and the like. For example, when there is a gradient whose notification should be made in the image displayed on the display device 8, the hue or luminance of the area with the gradient whose notification should be made may be changed. Moreover, it is possible to warn the driver to pay attention, by performing edge emphasizing processing on the area with the gradient whose notification should be made, and emphasizing and displaying an object and the like. In this case also, the display mode (hue, luminance, a degree of emphasized edge, and the like) may be changed, according to the level of attention that needs to be paid.

The notification unit 56 determines the notification content according to the detection result of the comparison unit 52 and the display mode determined by the display mode determination unit 54.

The output unit 40 outputs the notification content determined by the notification control unit 38 to the display control unit 14d.

FIG. 12 illustrates an example when the notification on the gradient information is performed by using the route index R. For example, when the gradient angle K is equal to or larger than the approach angle M1, the display color of the route index R described above is changed to a color different from that in normal time. In the case of FIG. 12, there is a gradient with an angle equal to or larger than the approach angle M1 on the route index R indicated for the right side front wheel 3F, and the display color of the route index R is displayed in "red", for example. By displaying in this manner, it is possible to notify the driver that the vehicle 1 may be unable to travel, when the vehicle 1 advances while keeping the current steering angle. When the notification is performed by using the route index R, the direction indicated by the route index R is correspondingly changed, when the driver operates the steering wheel unit 4 (steering wheel) and changes the direction of the front wheels 3F. As a result, the positional relation between the route of the front wheels 3F and the gradient the driver needs to pay attention will be changed. In other words, the notification state shifts to the state that does not need to pay attention and shifts to the state that needs to pay further attention. Consequently, in the case of the periphery monitoring system 100 of the present embodiment, when the notification on the gradient is performed by the route index R, it is possible to let the driver find a route that the vehicle 1 can easily travel, by making the driver steer the front wheels 3F so as to find the direction with which the notification will not be made.

Figure 13:
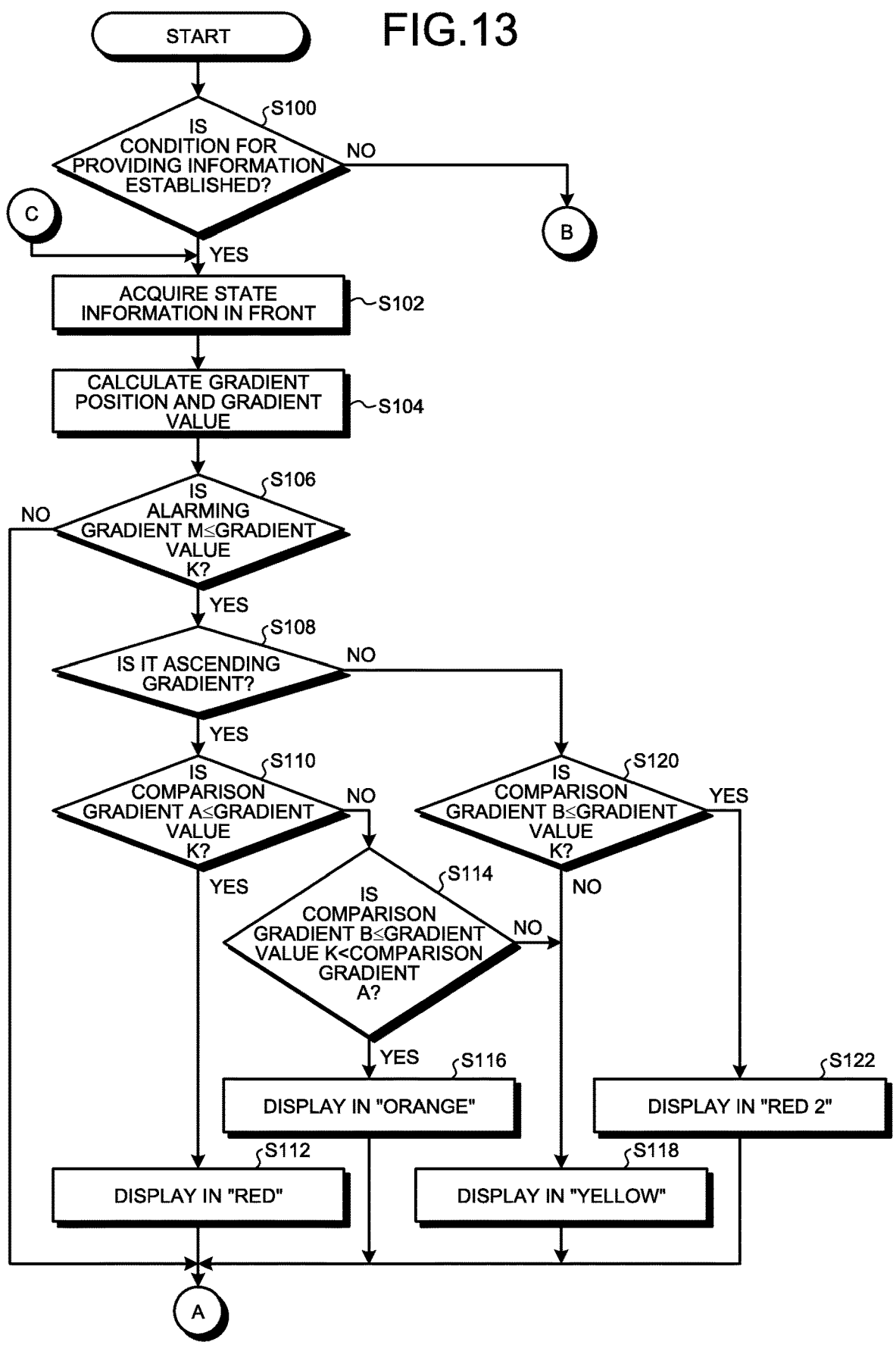
FIG. 13 is a flowchart illustrating the first half of a processing procedure to display the gradient information in the periphery monitoring device according to the embodiment.
Figure 14:
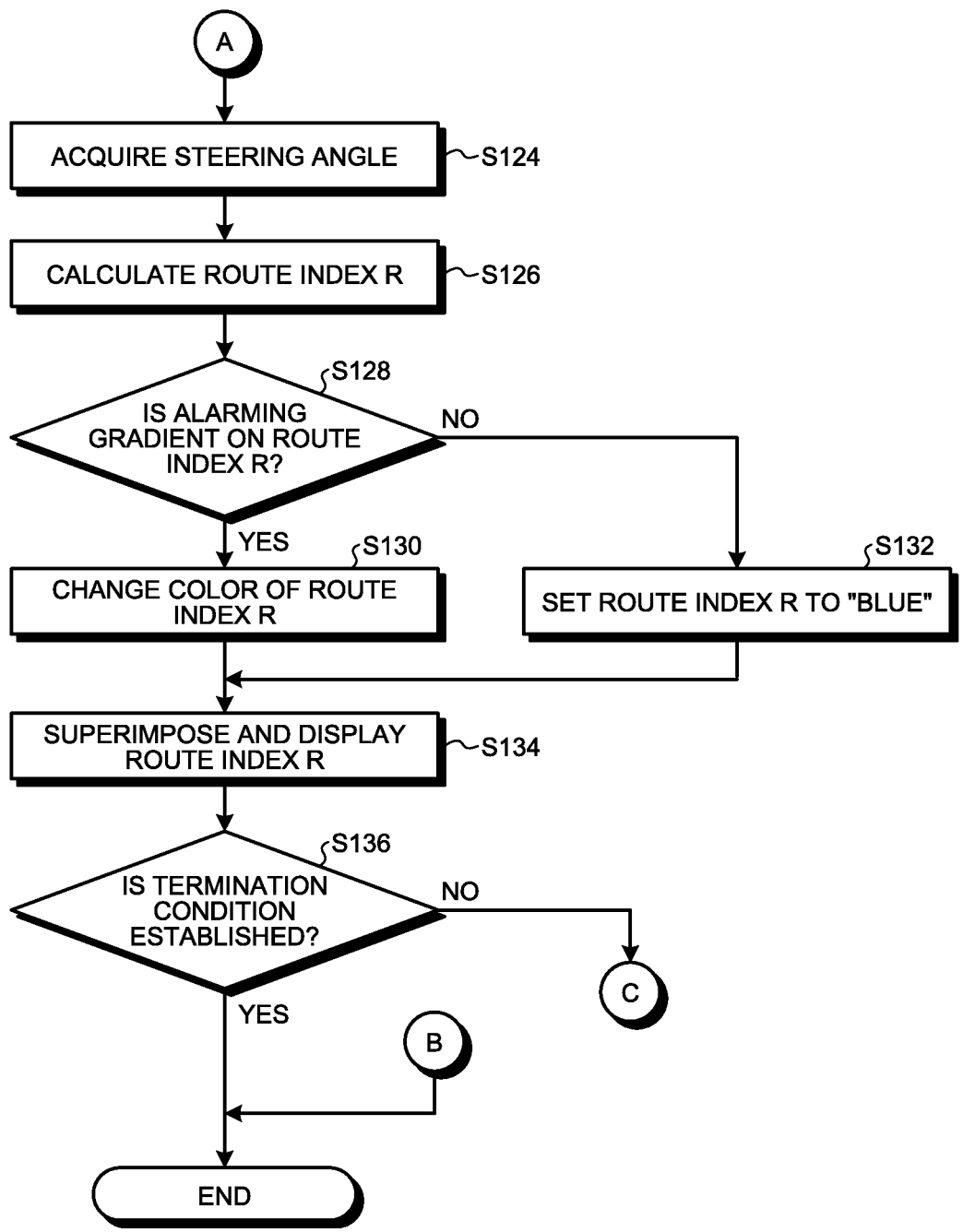
FIG. 14 is a flowchart illustrating the latter half of the processing procedure to display the gradient information in the periphery monitoring device according to the embodiment.

FIG. 13 and FIG. 14 are flowcharts for explaining an example of a processing procedure to display the gradient information in the periphery monitoring system 100. FIG. 13 is the first half of the process, and FIG. 14 is the latter half of the process. In the flowcharts illustrated in FIG. 13 and FIG. 14, notification on the gradient information is performed by using the route index R displayed on the actual image displayed on the display device 8 in a superimposed manner.

First, the ECU 14 confirms whether the condition for providing the gradient information is established (S100). For example, it is assumed that the condition for providing the gradient information is not established (No at S100), when the display mode of the display device 8 is not set to the display mode of the route index R, or when the speed of the vehicle 1 is not equal to or slower than a predetermined speed (for example, equal to or slower than 10 km/h). In other words, it is assumed that the vehicle 1 is normally traveling on the road surface with a small change in the gradient and that there is no need to provide gradient information. Consequently, the flow is temporarily finished.

When the condition for providing information is established (Yes at S100), in the ECU 14 (CPU 14*a*), the state information acquisition unit 30 acquires the output from the laser scanner 28 and acquires the state information indicating the state of the road surface in the traveling direction (front) of the vehicle 1 (S102). Then, the gradient acquisition unit 34 (gradient position acquisition unit 42 and gradient value acquisition unit 44) calculates the gradient position and the gradient value K on the basis of the information acquired by the state information acquisition unit 30 (S104). Next, the comparison unit 52 compares an alarming gradient M stored in the storage device such as the ROM 14*b* and the SSD 14*f* with the calculated gradient value K (S106). In this process, the alarming gradient M includes a gradient that the vehicle 1 may be unable to travel, and is the gradient that the driver needs to pay attention to travel. In other words, a gradient or the like that the vehicle 1 can climb over by a normal driving is not included in the alarming gradient M. When it is alarming gradient M≤gradient value K (Yes at S106), the gradient identification unit 46 confirms whether the gradient that the driver needs to pay attention is an ascending gradient (S108). When the gradient that the driver needs to pay attention is the ascending gradient (Yes at S108), the comparison unit 52 compares a comparison gradient A stored in the storage device such as the ROM 14*b* and the SSD 14*f* with the gradient value K (S110). In this case, for example, the comparison gradient A is a reference ascending gradient value such as the approach angle M1. In other words, if the road surface toward which the vehicle 1 is heading is the ascending gradient, whether the vehicle 1 may be unable to travel by entering the ascending gradient is detected. When the comparison result is comparison gradient A≤gradient value K (Yes at S110), in other words, when the vehicle 1 may be unable to travel, the display mode determination unit 54 determines to perform notification by setting the display color of the route index R to "red", as the notification mode (S112).

Moreover, at S110, when the comparison result is not comparison gradient A≤gradient value K (No at S110), the comparison unit 52 determines whether it is comparison gradient B≤gradient value K<comparison gradient A (S114). For example, the comparison gradient B is the ramp breakover angle M2. In other words, if the road surface toward which the vehicle 1 is heading is an ascending gradient, whether the driver needs to pay full attention although the vehicle 1 can travel the ascending gradient is detected. When the comparison result is comparison gradient B≤gradient value K<comparison gradient A (Yes at S114), in other words, when the vehicle 1 can travel by entering the ascending gradient, but the driver needs to pay full attention to travel, the display mode determination unit 54 determines to perform notification by setting the display color of the route index R to "orange", as the notification mode (S116).

Furthermore, when it is not comparison gradient B≤gradient value K<comparison gradient A at S114 (No at S114), it is assumed that there is a gradient on the road surface toward which the vehicle 1 is heading and that the driver should pay attention. Consequently, the display mode determination unit 54 determines to perform notification by setting the display color of the route index R to "yellow", as the notification mode (S118).

At S108, when it is not an ascending gradient (No at S108), in other words, when the road surface toward which the vehicle 1 is heading is a road surface with descending gradient, as illustrated in FIG. 10, the vehicle 1 may be unable to travel, because the vehicle body bottom portion 2*y* comes into contact with the connection portion GR that is a connection portion with the descending gradient. Thus, the comparison unit 52 compares the gradient value K with the comparison gradient B that is the ramp breakover angle M2 (S120). In this case, the comparison gradient B is a reference descending gradient value. When it is comparison gradient B≤gradient value K (Yes at S120), in other words, when the vehicle 1 may be unable to travel because the vehicle body bottom portion 2*y* comes into contact with the connection portion GR of the road surfaces, the display mode determination unit 54 determines to perform notification by setting the display color of the route index R to "red 2" that is different from "red" indicating that the vehicle 1 may be unable to travel the ascending gradient, as the notification mode (S122). For example, "red 2" is displayed in brighter red, flashing red, or the like, and identifies that the vehicle 1 may be unable to travel the descending gradient. It is to be noted that the other display color or the other display mode may also be used when the vehicle 1 may be unable to travel the descending gradient.

When it is not comparison gradient B≤gradient value K at S120 (No at S120), in other words, when the road surface toward which the vehicle 1 is heading is a descending gradient, but the gradient value K is smaller than the comparison gradient B (ramp breakover angle M2), the process proceeds to S118, and the display mode determination unit 54 determines to perform notification by setting the display color of the route index R to "yellow", as the notification mode (S118).

Then, the process proceeds to the flowchart in FIG. 14, and in the CPU 14*a*, the steering angle acquisition unit 32 acquires a steering angle of the current vehicle 1 (direction toward which the driver is about to proceed) indicated by the steering angle sensor 19 (S124). The route index calculation unit 48 then calculates the route index R (S126) on the basis of the current steering angle. The display mode determination unit 54 confirms whether there is a gradient of equal to or larger than the alarming gradient M on the route index R to be superimposed (S128). When the gradient of equal to or larger than the alarming gradient M is on the route index R (Yes at S128), the display mode determination unit 54 changes the display color of the route index R to the display color determined on the basis of the comparison result of the comparison unit 52 (S130). By contrast, when the gradient of equal to or larger than the alarming gradient M is not on the route index R (No at S128), the display mode determination unit 54 does not change the display color of the route index R, and for example, sets the display color to a normal color of "blue" (S132).

Next, the superimposition unit 50 superimposes the route index R the calculated display color of which is determined, on the image based on the captured image data picked up by the imaging unit 15 (S134). The output unit 40 outputs data (information) in which the route index R is superimposed on the actual image picked up by the imaging unit 15 toward the display control unit 14*d*, and causes the display device 8 to display the image.

When it is detected that the termination condition is established (Yes at S136), the ECU 14 temporarily terminates the flow. For example, the termination condition is assumed to be established, when the display mode of the display device 8 is switched to a mode of not displaying the route index R such as when the display mode is switched to a navigation screen or an audio screen, or when the speed of the vehicle 1 exceeds a predetermined speed (for example, 10 km/h). In other words, the termination condition is a condition by which it is determined that the presentation of the gradient information is not necessary. By contrast, when the termination condition is not established (No at S136), in other words, when it is determined that the presentation of the gradient information needs to be continued, the process returns to S102, and the display process of gradient information such as determining the display color of the route index R and the like is continued.

At S106, when it is not alarming gradient M≤gradient value K (No at S106), in other words, when the presentation of the gradient information is not necessary, the process proceeds to S124, and the process of displaying the route index R using a normal display color will be performed.

In this manner, in the periphery monitoring system 100 of the present embodiment, the gradient information is displayed by including the gradient information in the route index R to be displayed, on the basis of the operation state of the steering wheel unit 4 (steering wheel). Consequently, it is possible to easily notify the driver of the state of the road surface toward which the vehicle 1 is about to proceed and the dangerous degree of the road surface. It is also possible to allow the driver to intuitively understand the information on the gradient, and suitably warn the driver to pay attention.

Figure 15:
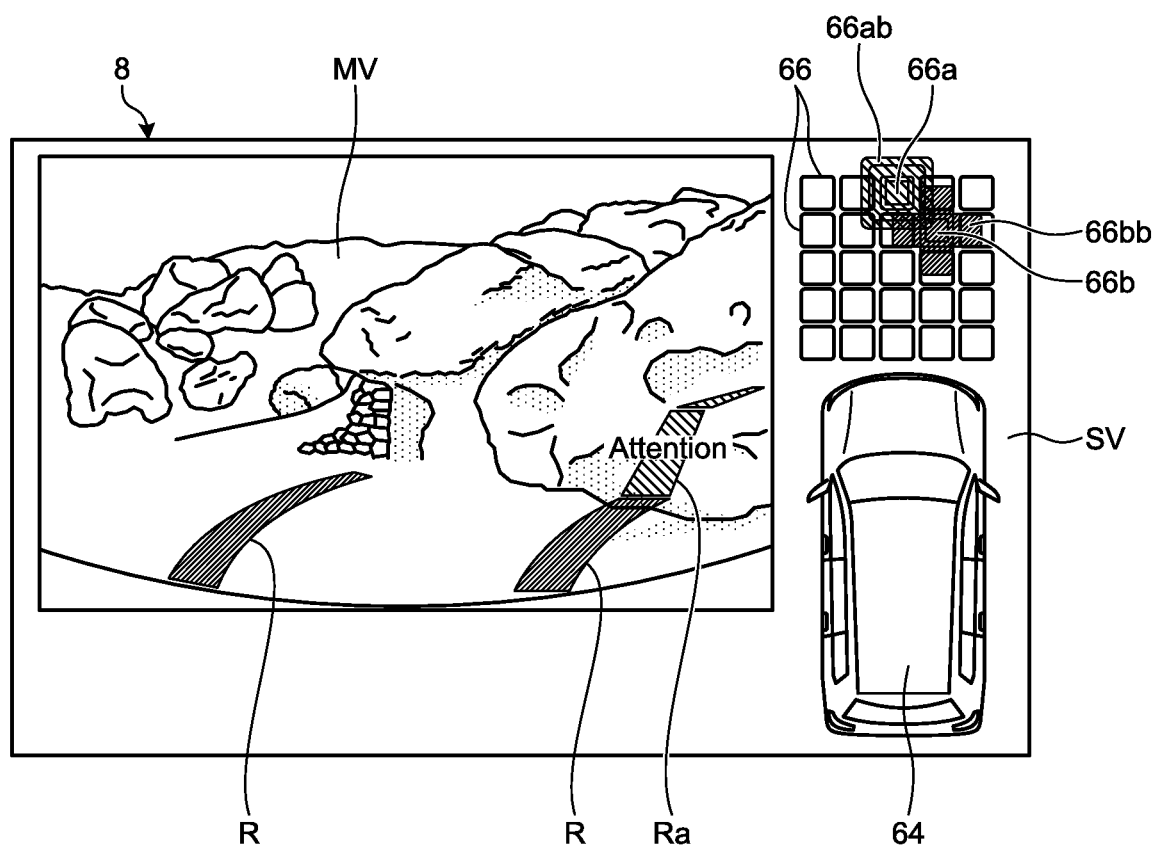
FIG. 15 is a diagram for explaining another example of a display screen for displaying the gradient information by the periphery monitoring device according to the embodiment.

FIG. 15 is a diagram illustrating another display example of the gradient information by the display device 8. In the case of FIG. 15, an image in which the route index R is superimposed on an image to which distortion correction and the like is applied on captured image data picked up by the imaging unit 15c and that is converted to a state close to the landscape viewed by the driver, is displayed in a main screen area MV of the display device 8. The route index R illustrated in FIG. 15 is not a two-dimensional display as illustrated in FIG. 12, but is a three-dimensional display corresponding to the change in the gradient. As illustrated in FIG. 15, the notification control unit 38 can change the display mode of at least a part of the route index R. In the case of FIG. 15, the display color of a portion that the vehicle 1 may be unable to travel (route index Ra) is changed, in the route index R of the right side front wheel 3F. Moreover, the presence of a gradient is three-dimensionally displayed, and the notification is made so that the driver can more easily understand the position of the gradient that the driver needs to pay attention. Furthermore, in the case of FIG. 15, character information (for example, Attention) is added on the route index Ra, thereby enabling the driver to pay attention more easily.

A symbol 64 viewing the vehicle 1 from above, and a plurality of divided areas 66 (for example, 5×5) are illustrated in a sub-screen area SV of the display device 8. In each of the divided areas 66, an average value of the gradient value included in the area is calculated, and the display color is determined by comparing the gradient value with the comparison gradient A and the comparison gradient B. For example, when the average gradient value is a value that the vehicle 1 may be unable to travel, a divided area 66a is indicated in "red". The periphery of the divided area 66a displayed in "red" is also set as an attention attracting display 66ab in similar "red" such that the driver needs to pay attention. Moreover, for example, a divided area 66b with the average gradient value that the driver needs to pay full attention although the vehicle 1 can travel is indicated in "yellow". The periphery of the divided area 66b displayed in "yellow" is also set as an attention attracting display 66bb in similar "yellow" such that the driver needs to pay attention. In the case of FIG. 15, the attention attracting display 66ab and the attention attracting display 66bb are colored such that a part of the divided area 66 is colored. However, the entire corresponding divided area 66 may also be colored. In this manner, by warning the driver to pay attention on the basis of the gradient information using the symbol 64 indicating the concerned vehicle and the divided area 66, it is possible to notify of the relative positional relation between the gradient position and the vehicle 1 to the driver in a form that the driver can understand easily and intuitively. Consequently, it is possible to let the driver more easily understand the surrounding state of the vehicle 1 and the dangerous degree of the gradient. The symbol 64 and the divided areas 66 displayed in the sub-screen area SV in FIG. 15 may be displayed in the main screen area MV, and the actual image including the route index R may be displayed in the sub-screen area SV. Moreover, only the actual image including the route index R may be displayed on the display device 8, or only the symbol 64 and the divided areas 66 may be displayed. When the gradient information is acquired by the laser scanner 28, and displayed in the sub-screen area SV in FIG. 15, the data obtained by the laser scanner 28 is stored for a certain period of time, and the entire area is displayed using the data including the past data.

In the front display area FV illustrated in FIG. 12, the display mode of the entire route index R is changed when there is a gradient whose notification should be made. However, as illustrated in FIG. 15, the display mode of a portion only corresponding to the gradient whose notification should be made, in other words, only a part of the route index R may be changed. Moreover, as illustrated in FIG. 12, a front reference line Qa indicating an indication of distance from the end portion 2c at the front side of the vehicle body 2 is displayed in the front display area FV. Thus, in the case of the display mode as illustrated in FIG. 12 also, the relative positional relation between the gradient position and the vehicle 1 is displayed, and it is possible to notify the driver in a form that the driver can understand the gradient position easily and intuitively. Consequently, it is possible to let the driver more easily understand the surrounding state of the vehicle 1 and the dangerous degree of the gradient. In the case of the main screen area MV in FIG. 15, it is also possible to display the end portion of the front side of the vehicle body 2. Thus, it is possible to similarly display the relative positional relation between the gradient position and the vehicle 1.

Figure 16:
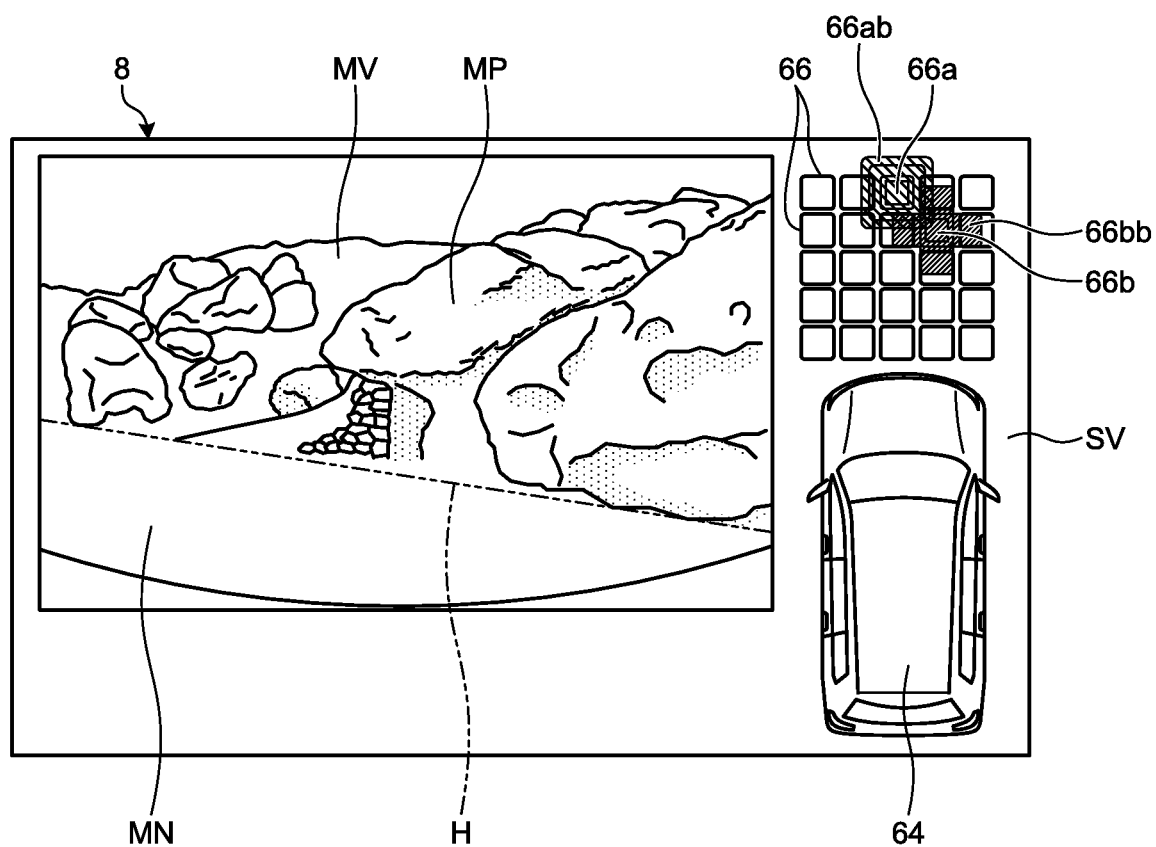
FIG. 16 is a diagram for explaining another example of a display screen for displaying the gradient information by the periphery monitoring device according to the embodiment.

In the display example illustrated in FIG. 15, the route index R is displayed on the actual image (three-dimensional display) in a superimposed manner, and the gradient information is included in the route index R. In the display example illustrated in FIG. 16, the route index R is not displayed, and the comparison result of the notification control unit 38 (comparison unit 52) is displayed on the display device 8, by performing image processing such as changing the hue and luminance of the area where there is an object with a gradient, and executing edge emphasizing processing on the area with a gradient. In the display example illustrated in FIG. 16, the notification control unit 38 (display mode determination unit 54) performs image processing on the main screen area MV of the display device 8 so that an area MP that is regarded to include the gradient whose notification should be made is further emphasized relative to an area MN that is regarded not to include the gradient whose notification should be made. The image processing is performed such that the area MP seems to stand up with respect to the area MN, with a separation line H used as a border. As a result, the portion where the hue change processing, the luminance change processing, the edge emphasizing processing, or the like is performed is further emphasized. Moreover, it is possible to warn the driver to pay attention, by only performing the image processing such that the area MP seems to stand up, without performing the hue change processing, the luminance change processing, or the edge emphasizing processing. In other words, in FIG. 16, a captured image is projected on a predetermined three-dimensional projection diagram, as one of the image processing on the captured image data.

For example, to change the hue, a predetermined range around the gradient position detected by the gradient position acquisition unit 42 may be made as an image in which the hue according to the notification level, for example, "red", is emphasized. Similarly, the luminance of the predetermined range may be increased around the gradient position detected by the gradient position acquisition unit 42. Moreover, to perform the edge emphasizing processing, a known filter processing for emphasizing the edge is performed on the image based on the captured image data picked up by the imaging unit 15, on a predetermined range around the gradient position detected by the gradient position acquisition unit 42. As a result, it is possible to highlight the gradient position the driver needs to pay attention. In this manner, by not displaying the route index R, but by changing the hue or luminance, or performing the edge emphasizing processing, it is possible to provide the gradient information without hiding the actual image (object on the actual image). As a result, it is possible to not only let the driver easily understand the surrounding state, particularly, the presence of an object and the like, but also to provide the gradient information.

In another embodiment, the image processing such as the hue change processing, the luminance change processing, and the edge emphasizing processing may only be performed on the gradient portion whose notification should be made, in the image based on the captured image data. Moreover, in the case of FIG. 16, the hue change processing, the luminance change processing, and the edge emphasizing processing are only performed on the gradient portion whose notification should be made. However, for example, the hue change processing, the luminance change processing, the edge emphasizing processing, and the like may be performed on the entire area MP where there is a gradient whose notification should be made, with the separation line H used as a border. In this case, the area after a certain point may be emphasized as an area the driver needs to pay attention.

In the embodiment described above, for example, when the route index R is used, the route index R is displayed in a state that the route index R is extended to a predetermined length (for example, two meters ahead) including the position where the vehicle 1 may be unable to travel. In another embodiment, for example, the display of the route index R may be stopped at the position where the vehicle 1 may be unable to travel. In this case, by not displaying the route index R from halfway, it is possible to notify the driver that the vehicle 1 cannot travel from thereon. Moreover, the portion where the route index R is cut off may be emphasized with red or like, and may notify the driver that the vehicle 1 cannot travel because of a large gradient change.

Moreover, in the embodiment described above, the laser scanner 28 for acquiring the state information indicating the state of the road surface in the traveling direction of the vehicle 1 is used. However, it is not limited thereto, and it is possible to use any device as long as the device can acquire the gradient position and the gradient value in an associated manner. For example, a stereo camera may also be used instead of the laser scanner 28. The stereo camera is also provided on the position of the end portion 2c at the front side of the vehicle 1, such as on the front bumper and the front grille. The captured image data obtained by the stereo camera includes a wide range of gradient information in the front direction of the vehicle 1. Consequently, it is possible to provide more accurate gradient information.

Furthermore, in the embodiment described above, the gradient state is displayed by the display device 8 to notify of the gradient state. However, in another embodiment, the notification of the gradient state may be made by voice. In this case, a message such as "there is a gradient unable to climb over in two meters ahead" or "there is a gradient you need to pay full attention to drive in two meters ahead" may be output from the sound output device 9. Moreover, the gradient information may be provided by the display of the display device 8 and the voice of the sound output device 9. Furthermore, as illustrated in the sub-screen area SV in FIG. 15, when it is possible to detect the gradient state and the presence of a gradient over a wide range in front of the vehicle 1, voice and the like may be used to notify the driver which direction the steering wheel unit 4 should be steered to drive safely.

Still furthermore, in the flowcharts in FIG. 13 and FIG. 14, the notification is made when the vehicle may be unable to travel, when the vehicle 1 continues to travel, and the road surface and the vehicle body bottom portion 2y come into contact (rubbed) with each other. In other words, the gradient acquisition unit 34 acquires the inclination of the vehicle 1 relative to the road surface in front of the vehicle 1, using, as reference, the road surface on which the vehicle 1 is present, as the gradient value, and compares the gradient value with the reference gradient value (comparison gradient value A and comparison gradient value B). In another embodiment, when the vehicle 1 continues to travel on the road surface with a gradient (the second road surface continued to the first road surface), the ECU 14 may notify the driver that the vehicle 1 may be unable to travel because the gradient exceeds the climbing ability or the descending ability. In this case, the gradient acquisition unit 34 acquires inclination obtained by adding the current inclination of the vehicle 1 to the relative inclination of the road surface toward which the vehicle 1 is about to proceed, in other words, the estimated inclination of the vehicle 1 with respect to horizontal (absolute inclination), as the gradient value. For example, the gradient acquisition unit 34 acquires a relative inclination of the second road surface (for example, road surface with ascending gradient) in front of the vehicle 1 using, as reference, the first surface (for example, road surface with ascending gradient) on which the vehicle 1 is present. In this case, the gradient position acquisition unit 42 acquires the relative inclination on the basis of the detection result of the laser scanner 28. Moreover, the gradient acquisition unit 34 acquires the inclination of the vehicle 1 present on the first road surface (road surface with ascending gradient) on the basis of the detection result of the acceleration sensors 26. Then, by adding the current inclination of the vehicle 1 on the relative inclination of the road surface in front of the vehicle 1, it is possible to acquire the estimated inclination with respect to horizontal, when the vehicle 1 enters the second road surface. By comparing between the calculated inclination with respect to horizontal and the climbing limit value, the comparison unit 52 can determine whether the vehicle 1 may be unable to travel, when the vehicle 1 continues to travel. The same applies when the first road surface and the second road surface are descending gradients. Moreover, when the directions of the gradients of the first road surface and the second road surface are opposite, the inclination of the vehicle 1 is calculated when the vehicle 1 enters the second road surface, by adding the gradients of the first road surface and the second road surface.

The display mode determination unit 54 determines the display mode of the notification on the basis of the determination result. For example, when the inclination with respect to horizontal exceeds the climbing ability (descending ability), the display mode determination unit 54 determines to display the route index R to be displayed in red. Moreover, when the inclination with respect to horizontal does not exceed the climbing ability (descending ability) but the driver needs to pay full attention, the display mode determination unit 54 determines to display the route index R in orange. Similarly, the display mode determination unit 54 determines to set the display mode of the route index R in yellow or a normal color, on the basis of the comparison result with the climbing ability (descending ability).

In this manner, the periphery monitoring system 100 of the present embodiment can detect in advance that the vehicle 1 will not be able to travel when the vehicle 1 is about to enter the road surface with other features (for example, gradient) from the road surface on which the vehicle 1 is currently present, because the front bumper 2x, the vehicle body bottom portion 2y, or the like may come into contact with the road surface. The periphery monitoring system 100 can also detect in advance that the vehicle 1 will not be able to travel, because the gradient exceeds the traveling ability (climbing ability and descending ability). Consequently, it is possible to notify the driver, and allow the driver to more accurately determine whether the vehicle 1 can travel.

Embodiments and modifications of the present invention have been described. However, the embodiments and the modifications are merely examples, and are not intended to limit the scope of the invention. These novel embodiments may be implemented in various other forms, and various omissions, replacements, and modifications may be made without departing from the scope and spirit of the invention. These embodiments and modifications are included in the scope and spirit of the invention, and are included in the invention described in the claims and their equivalents.

EXPLANATIONS OF LETTERS OR NUMERALS 1 vehicle
3 wheel
3F front wheel
4 steering wheel unit
8 display device
8a screen
10 operation input unit
11 monitor device
14 ECU
14a CPU
14b ROM
14c RAM
15 imaging unit
19 steering angle sensor
26 acceleration sensor
28 laser scanner
30 state information acquisition unit
32 steering angle acquisition unit
34 gradient acquisition unit
36 image processing unit
38 notification control unit
40 output unit
42 gradient position acquisition unit
44 gradient value acquisition unit
46 gradient identification unit
48 route index calculation unit
50 superimposition unit
52 comparison unit
54 display mode determination unit
56 notification unit
100 periphery monitoring system
R route index

The invention claimed is:

1. A periphery monitoring device, comprising:
a gradient acquisition unit that acquires a gradient position and a gradient value on a road surface, based on state information indicating a state of the road surface in a traveling direction of a vehicle; and
a notification control unit that compares the gradient value with a reference gradient value at which the vehicle is able to pass, and notifies of a comparison result in association with the gradient position,
wherein the gradient acquisition unit identifies whether a gradient at the gradient position is an ascending gradient or a descending gradient, and
when the gradient is the ascending gradient, the notification control unit compares the gradient with a reference ascending gradient value and, when the gradient is the descending gradient, the notification control unit compares the gradient with a reference descending gradient value.

2. The periphery monitoring device according to claim 1, wherein the gradient acquisition unit acquires, as the gradient value, a relative inclination of a road surface in front of the vehicle, using, as reference, a road surface on which the vehicle is present.

3. The periphery monitoring device according to claim 1, wherein the gradient acquisition unit acquires inclination with respect to horizontal, as the gradient value.

4. The periphery monitoring device according to claim 1, wherein the notification control unit notifies of the gradient position using, as reference, the vehicle.

5. The periphery monitoring device according to claim 1, wherein the notification control unit displays a relative positional relation between the gradient position and the vehicle on a display device that displays an image based on captured image data output from an imaging unit that images a periphery state of the vehicle.

6. The periphery monitoring device according to claim 5, wherein the notification control unit causes the display device to display the comparison result by performing image processing on the image based on the captured image data.

7. The periphery monitoring device according to claim 5, further comprising:
an image processing unit that superimposes a route index indicating an estimated traveling direction of a wheel based on a steering angle of the vehicle, on the image based on the captured image data, wherein
the notification control unit causes the display device to display the comparison result with the route index, when the gradient position is on the route index.

8. The periphery monitoring device according to claim 7, wherein the notification control unit changes a display mode of at least a part of the route index.

* * * * *